United States Patent
Pereira et al.

(10) Patent No.: US 10,518,825 B2
(45) Date of Patent: Dec. 31, 2019

(54) ROOF FAIRING WITH DISTRIBUTED FLOW CHANNELS

(71) Applicant: SABIC GLOBAL TECHNOLOGIES B.V., Bergen op Zoom (NL)

(72) Inventors: Carlos Pereira, Selkirk, NY (US); Max Ulysses Morton, Averill Park, NY (US); Matthew Douglas Marks, White Lake, MI (US)

(73) Assignee: SABIC Global Technologies B.V., Bergen op Zoom (NL)

(*) Notice: Subject to any disclaimer, the term of this patent is extended or adjusted under 35 U.S.C. 154(b) by 0 days.

(21) Appl. No.: 16/336,300

(22) PCT Filed: Sep. 27, 2017

(86) PCT No.: PCT/US2017/053776
§ 371 (c)(1),
(2) Date: Mar. 25, 2019

(87) PCT Pub. No.: WO2018/064197
PCT Pub. Date: Apr. 5, 2018

(65) Prior Publication Data
US 2019/0225282 A1    Jul. 25, 2019

Related U.S. Application Data

(60) Provisional application No. 62/400,486, filed on Sep. 27, 2016.

(51) Int. Cl.
*B62D 35/00* (2006.01)

(52) U.S. Cl.
CPC ......... *B62D 35/001* (2013.01); *B62D 35/005* (2013.01); *B62D 35/008* (2013.01); *B60Y 2200/142* (2013.01)

(58) Field of Classification Search
CPC ... B62D 35/001; B62D 35/005; B62D 35/008
(Continued)

(56) References Cited

U.S. PATENT DOCUMENTS 4,343,506 A * 8/1982 Saltzman ............. B62D 35/001
                                                     105/1.2
8,177,479 B2 * 5/2012 Watts ..................... B60K 16/00
                                                      415/4.1
(Continued)

FOREIGN PATENT DOCUMENTS

CN        201195558 Y      2/2009
CN        101668673 A      3/2010
(Continued)

OTHER PUBLICATIONS

International Patent Application No. PCT/US2017/053776; Int'l Preliminary Report on Patentability; dated Apr. 11, 2019; 8 pages.

*Primary Examiner* — Dennis H Pedder
(74) *Attorney, Agent, or Firm* — Baker Hostetler

(57) ABSTRACT

Disclosed is a roof fairing for a vehicle, such as a truck hauling a trailer. The roof fairing includes a body defining a flow directing exterior surface. The body including at least one flow directing channel that is sunk into the body toward an inner space defined by an interior surface of the body. The flow directing channel comprises a venturi construction terminating at the trailing edge. The venturi construction is configured to direct flow toward an exterior surface of the trailer when coupled to the truck.

20 Claims, 17 Drawing Sheets

(58) Field of Classification Search
USPC .......................................... 296/180.1, 180.2
See application file for complete search history.

(56) References Cited

U.S. PATENT DOCUMENTS

| | | | | |
|---|---|---|---|---|
| 8,770,649 | B2* | 7/2014 | Praskovsky | B62D 35/001 |
| | | | | 296/180.1 |
| 8,870,275 | B1 | 10/2014 | Schmidt | |
| 9,340,240 | B2* | 5/2016 | Clark | B62D 35/001 |
| 10,081,397 | B2* | 9/2018 | Bacon | B62D 35/001 |
| 2005/0040668 | A1 | 2/2005 | Wood | |
| 2007/0246969 | A1* | 10/2007 | Smith | B62D 35/001 |
| | | | | 296/180.2 |
| 2011/0011072 | A1* | 1/2011 | Watts | B60K 16/00 |
| | | | | 60/327 |
| 2011/0175395 | A1* | 7/2011 | Guigne | B62D 35/001 |
| | | | | 296/180.3 |
| 2012/0090717 | A1* | 4/2012 | Watts | B60K 16/00 |
| | | | | 138/26 |
| 2015/0108787 | A1* | 4/2015 | Schmidt | B62D 35/001 |
| | | | | 296/180.2 |
| 2015/0337878 | A1* | 11/2015 | Schlosser | F42B 10/42 |
| | | | | 181/213 |

FOREIGN PATENT DOCUMENTS

| | | |
|---|---|---|
| CN | 201914337 U | 8/2011 |
| CN | 205524530 U | 8/2016 |
| SU | 1371939 A1 | 2/1988 |
| WO | 2014162158 A2 | 10/2014 |
| WO | WO 2016/077669 A1 | 5/2016 |

\* cited by examiner

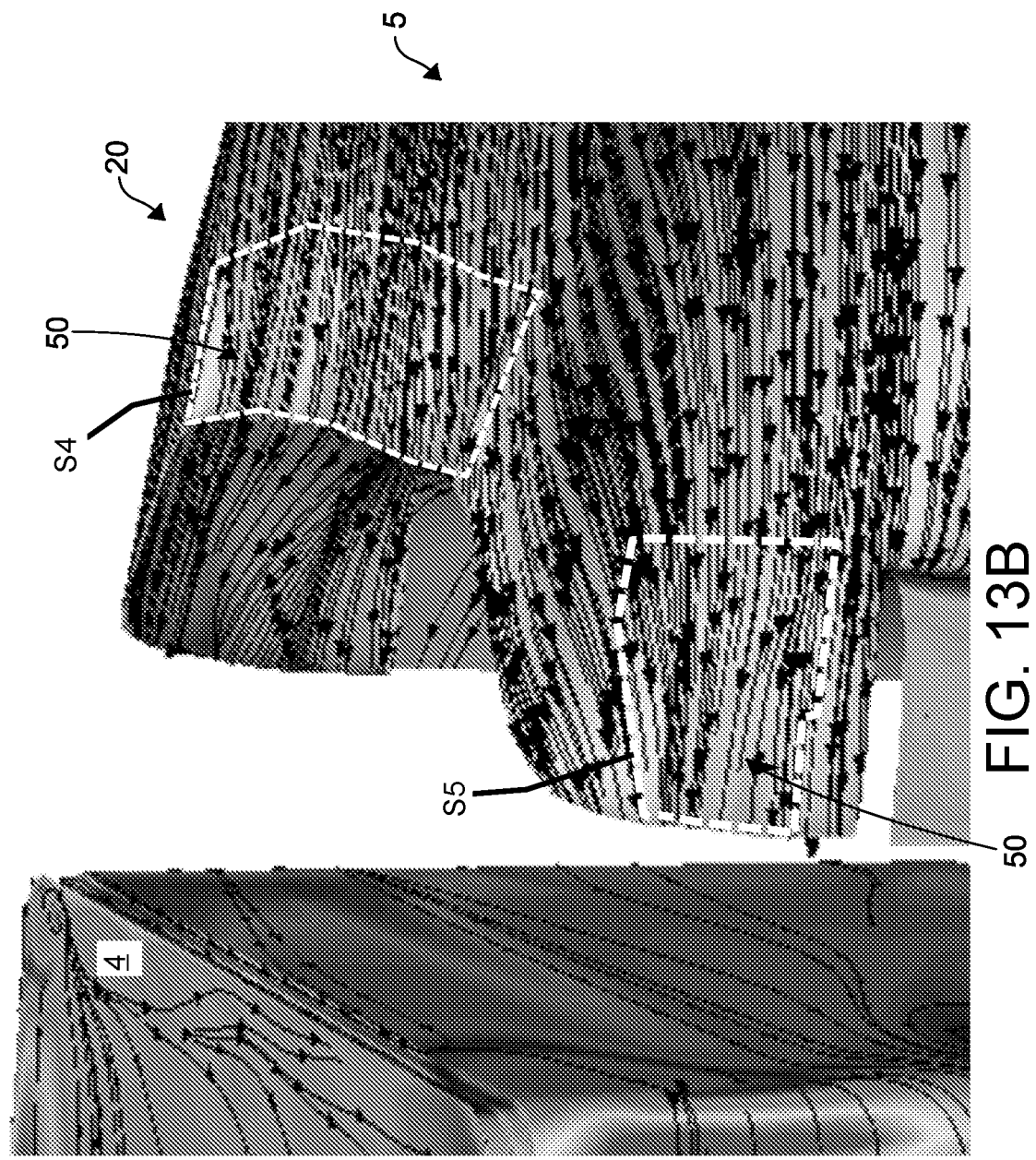

ROOF FAIRING WITH DISTRIBUTED FLOW CHANNELS

CROSS-REFERENCE TO RELATED APPLICATION

This application is the National Stage of International Application No. PCT/US2017/053776, filed Sep. 27, 2017, which claims the benefit of U.S. Provisional Application No. 62/400,486 filed Sep. 27, 2016, the disclosures of which are incorporated herein by this reference in their entireties.

TECHNICAL FIELD

The present disclosure relates to a fairing for a vehicle, and in particular, to a fairing that includes distributed flow channels.

BACKGROUND

Vehicle original equipment manufacturers and fleet owners are continually looking for solutions to improve vehicle mileage and decrease harmful emissions. Regulations are currently being drafted worldwide that will enforce the further reduction of vehicle emissions. Solutions that can improve vehicle mileage and reduce vehicle emissions are continually desired.

SUMMARY

Typical fairings used on a roof of a vehicle may not adequately direct flows across a tractor-trailer gap. In some instances, air flow over fairings impinge a forward end of a trailer increasing surface velocity and static pressure at the forward end of the trailer. Cross-winds can create regions of high pressure at the left and right front surfaces of the trailer depending on the cross-wind direction. In some cases flow channels and/or streamlined fairing surfaces are used to direct air flows over the fairing and across the tractor-trailer gap. Such fairings may not attain the desired reduction in aerodynamic drag that would result in observable reductions in vehicle mileage, especially in presence of cross-winds. The fairings as described herein may reduce aerodynamic drag on the truck, which in turn, can increase fuel economy and reduce emissions. An aspect of the present disclosure is a fairing for a roof of a vehicle that comprises a flow directing body with a one or more flow channels located proximate a trailing end of the fairing. Each of the flow channels have a venturi profile. The flow channel tapers from a generally wide inlet toward a narrow constriction at or near the outlet of the flow channel. The tapering near the inlet can direct laterally originating air flows (non-zero yaw) into the flow channel while the constriction causes the air flow to exit the outlet and cross the gap at a higher velocity than the velocity of the air flow at the inlet of the flow channel. This, in turn, improves control of air flow control across a range of cross-winds. Accordingly, the fairing as described herein can better control air flows at the trailing end of the fairing and accelerate air flows through the channel so that air flow velocity across the tractor-trailer gap is increased.

FIGURES

The foregoing summary, as well as the following detailed description of illustrative aspects of the present application, will be better understood when read in conjunction with the appended drawings. For the purposes of illustrating the present application, there is shown in the drawings illustrative aspects of the disclosure. It should be understood, however, that the application is not limited to the precise arrangements and instrumentalities shown.

Figure 11A:
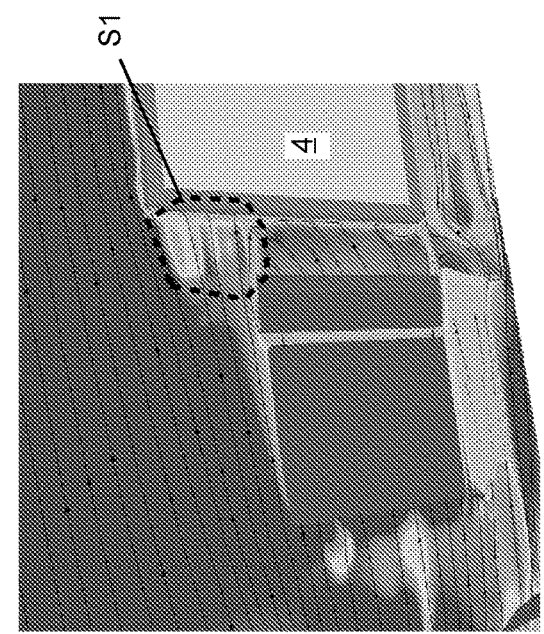
Figure 11B:
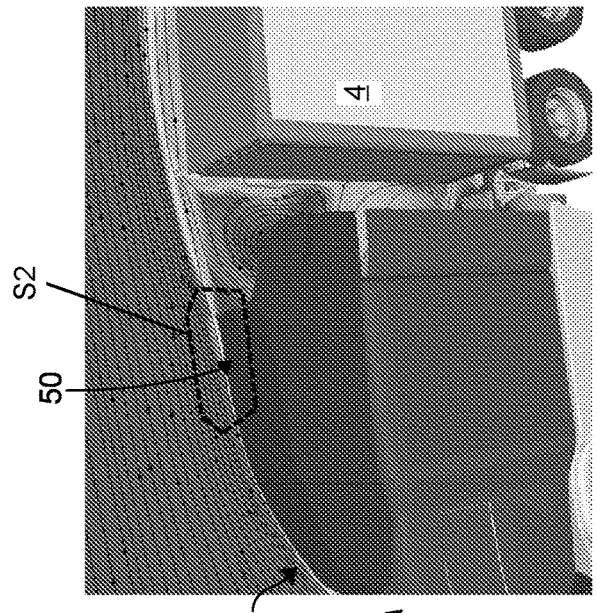
Figure 11C:
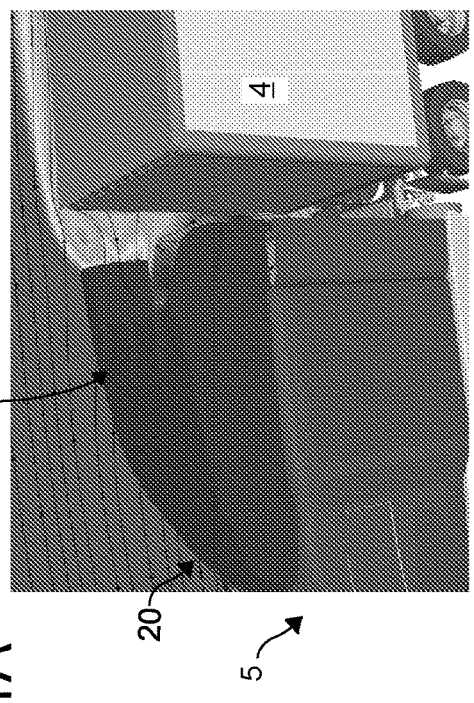
Figure 12A:
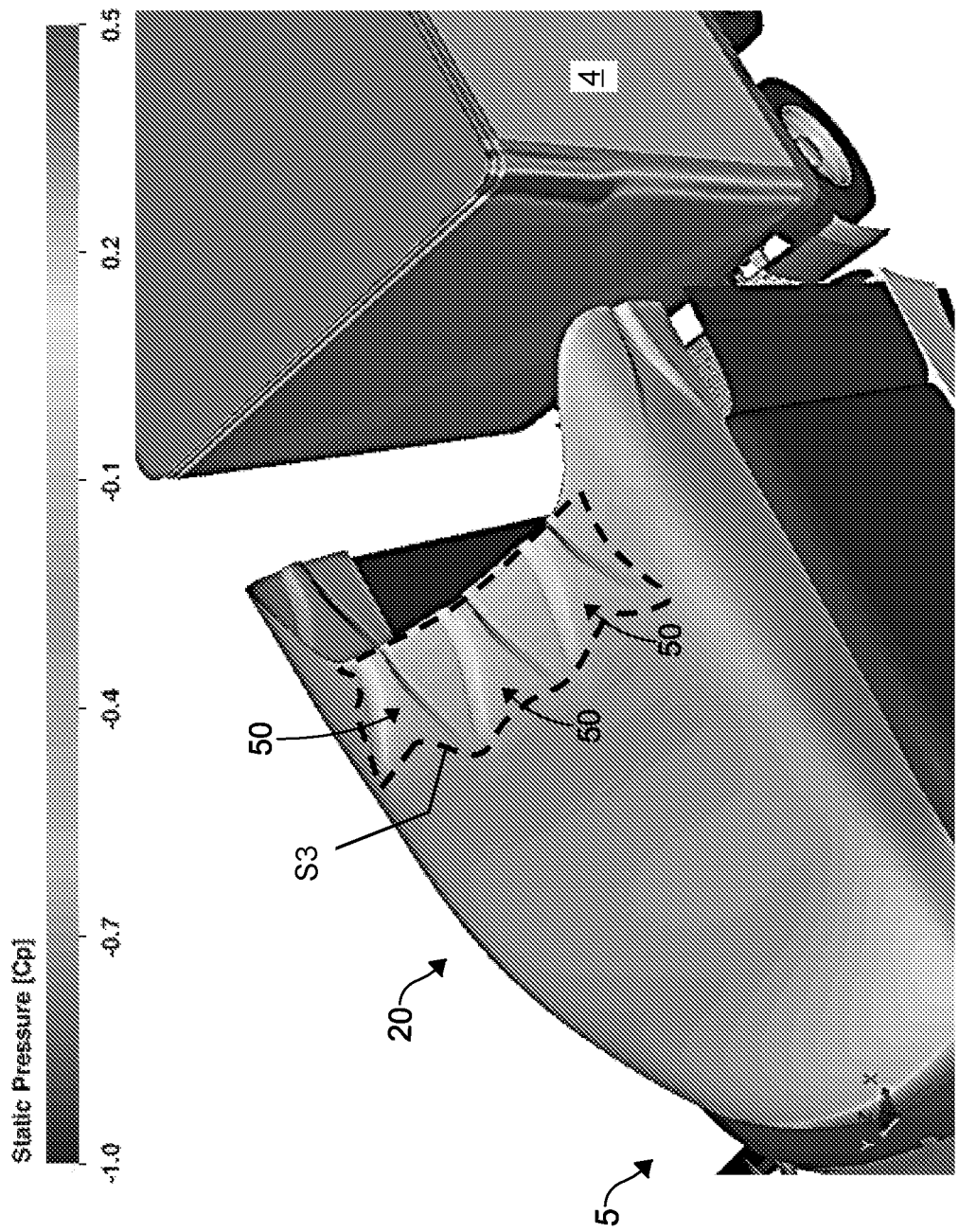

FIGS. 11A, 11B, and 11C are a magnitude velocity maps on a fairing on a tractor trailer;

FIG. 12A is a static pressure map along an upper surface of a fairing on a tractor trailer; and FIGS. 13A, 13B, 13C, and 13D are surface velocity maps of a fairing on a tractor trailer.

DETAILED DESCRIPTION

Figure 1:
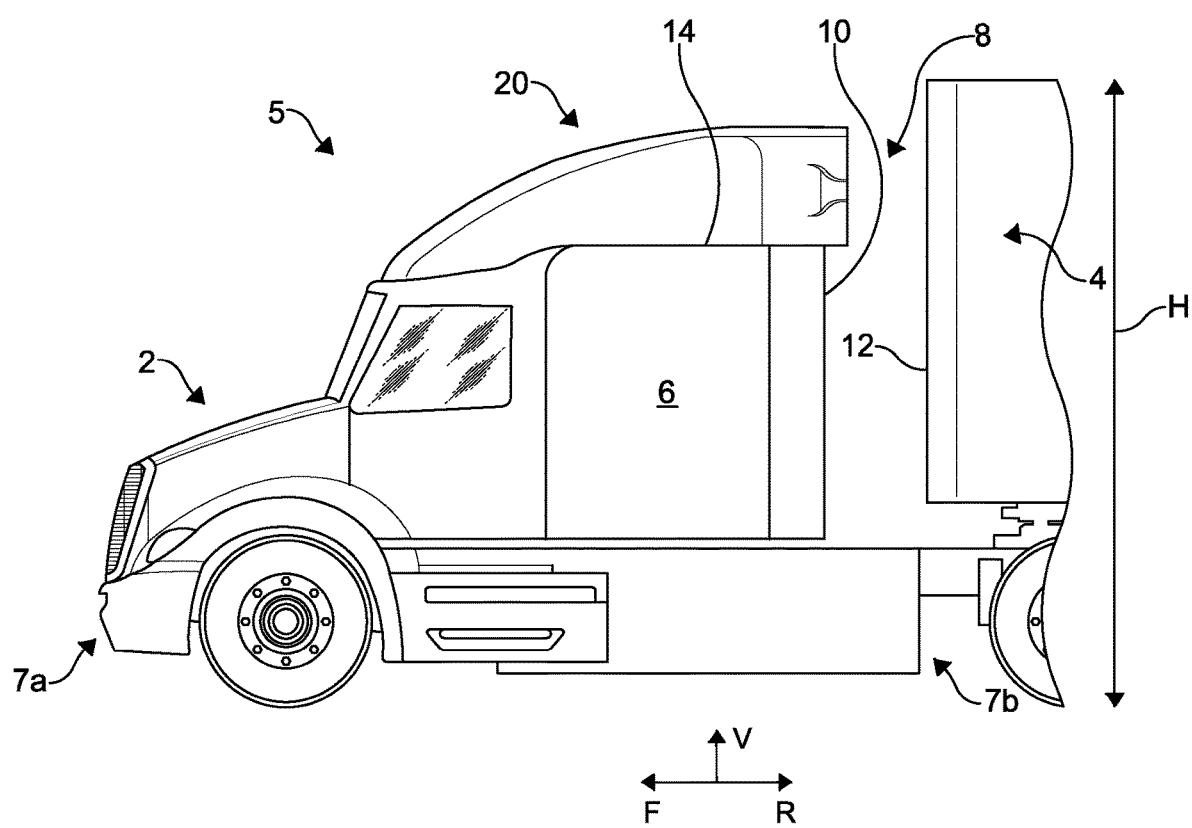
FIG. 1 is a side view of a tractor-trailer including a fairing according to an aspect.
Figure 2:
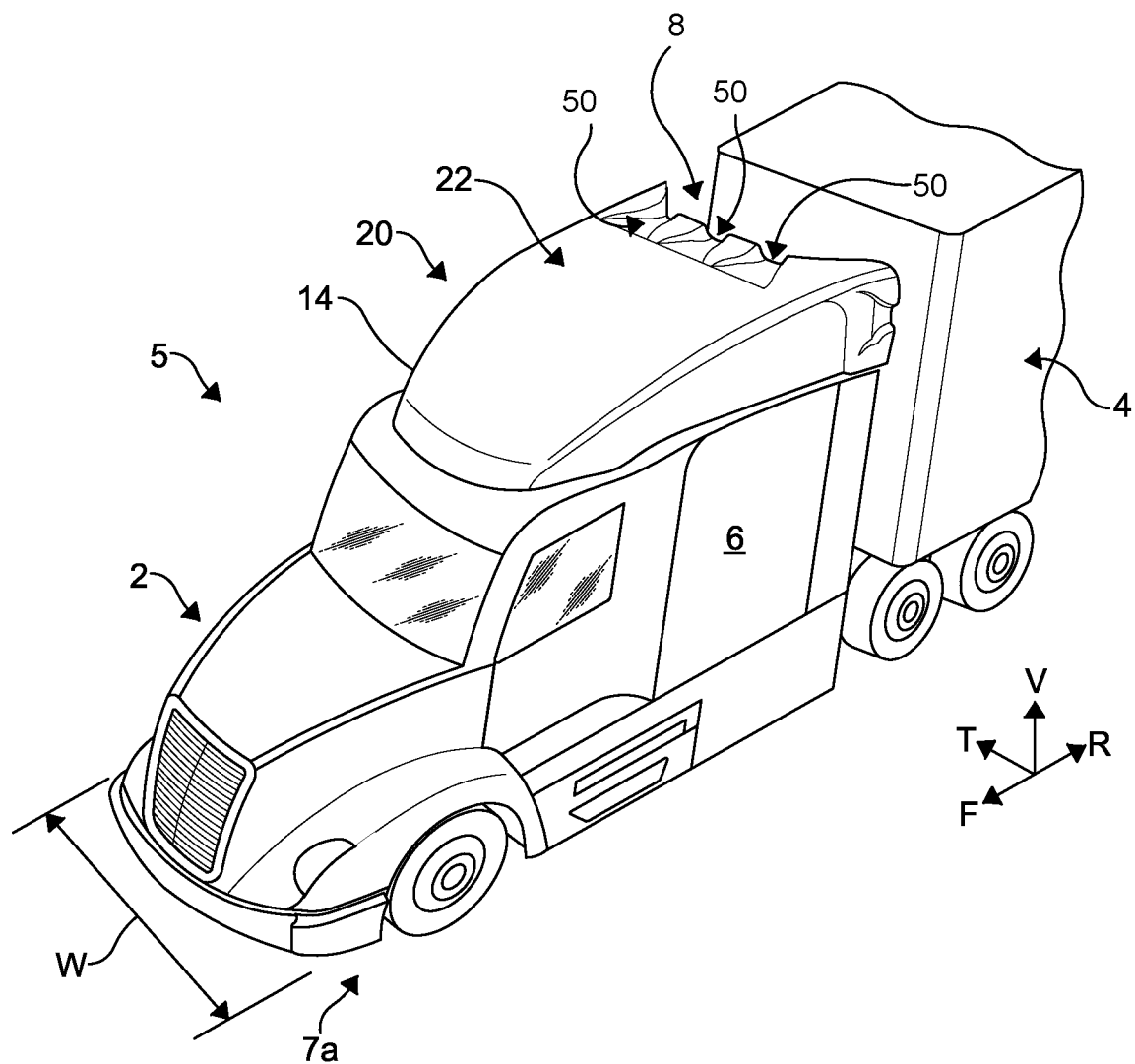
FIG. 2 is a top perspective view of the tractor-trailer illustrated in FIG. 1.

Aspects of the present disclosure include fairings designed to assist in the control of air in and around the vehicle, such as a truck 2 as shown in FIGS. 1 and 2. As shown in FIGS. 1 and 2, a fairing 20 is configured for placement onto a roof 14 of a truck 2. The truck 2 may be adapted to tow a trailer 4. The truck 2 has a cab 6 and a fifth wheel (not numbered) that is used to secure the trailer 4 to the truck 2. The truck 2 and the trailer 4 are sometimes referred to as a tractor-trailer 5. A tractor-trailer 5 creates a gap 8 that extends from a trailing end 10 of the cab 6 to the forward end 12 of the trailer 4. The fairing 20 includes one or more flow channels 50a-50c (FIG. 2) that improve and/or help control air flow across and around the gap 8 when the tractor-trailer 5 is in motion. The improved air flow across and around the gap 8 may reduce pressure at the forward end 12 of the trailer 4, which in turn, reduces aerodynamic drag. In this instance, aerodynamic drag can be described as the retarding force acting on the tractor-trailer 5 moving through air parallel and opposite to the direction of motion. Contributors to aerodynamic drag of a tractor-trailer 5 can include stagnation pressures at a front end, turbulent inflows at the gap 8, underside flows, wake at a rear of the trailer 4, and the like. Accordingly, optimization of airflow around the fairing 20 may reduce aerodynamic drag.

Improved aerodynamic air flows over a vehicle and its components have long been assumed to yield advancements in vehicle fuel efficiency. It can be difficult, however, to improve vehicle mileage (e.g., through improved fuel economy) and emissions. Increasing a vehicle's miles per gallon (mpg) and reducing vehicle emissions can be advantageous in terms of lowering operating costs and complying with emission and fuel economy regulatory requirements. For example, a model Class 8 tractor-trailer can weigh up to approximately 37,000 kilograms (kg) (approximately 80,000 pounds) and can have a wind averaged drag coefficient (Co) of approximately 0.60. At a highway speed of 65 miles per hour (mph) (104.6 kilometers per hour (kph)), about 65% of the total energy expended goes to overcome the aerodynamic drag. Hence, fuel savings and cost of operating a truck can be optimized by improving aerodynamic performance by reducing aerodynamic drag. The fairings as described herein may reduce aerodynamic drag on the truck 2, which in turn, can increase fuel economy and reduce emissions.

Referring to FIGS. 1 and 2, the fairing 20 is positioned on the roof 14 of the truck 2 and deflects air across the gap 8 when the truck 2 is in motion. The truck 2 has a front 7a and a rear 7b spaced from the front 7a along a forward-rearward direction FR. As used herein, a forward-rearward direction FR includes a forward directional component F, which is a direction toward the front 7a of the truck 2 from a given point of reference. The forward-rearward direction FR also includes a rearward directional component R, which is a direction toward the rear of the truck 2 from a given point of reference. Furthermore, the forward-rearward direction FR is aligned with a forward-rearward axis 1. The truck 2 has a height H that extends along a vertical direction V that is perpendicular to the forward-rearward direction FR. The truck 2 has a width W that extends along a transverse direction T that is perpendicular to the vertical direction V and the forward-rearward direction FR. The directional components described above for the truck 2 apply to various aspects of the fairings described herein. Accordingly, the forward-rearward direction FR, vertical direction V, and transverse direction T are directional components used to describe and illustrate fairings and their components.

Referring to FIGS. 3A-5B, the fairing 20 includes a flow directing body 22 and optionally an internal frame 24 (not shown) attached to an inner surface 26 of the flow directing body 22. The flow directing body 22 further includes an exterior surface 28 opposite to the inner surface 26. The exterior surface 28 includes a plurality of the flow channels 50a-50c as will be explained further below. The reference number "50" and reference numbers "50a," "50b," and "50c" may be used interchangeably in the present disclosure unless noted otherwise.

Figure 3A:
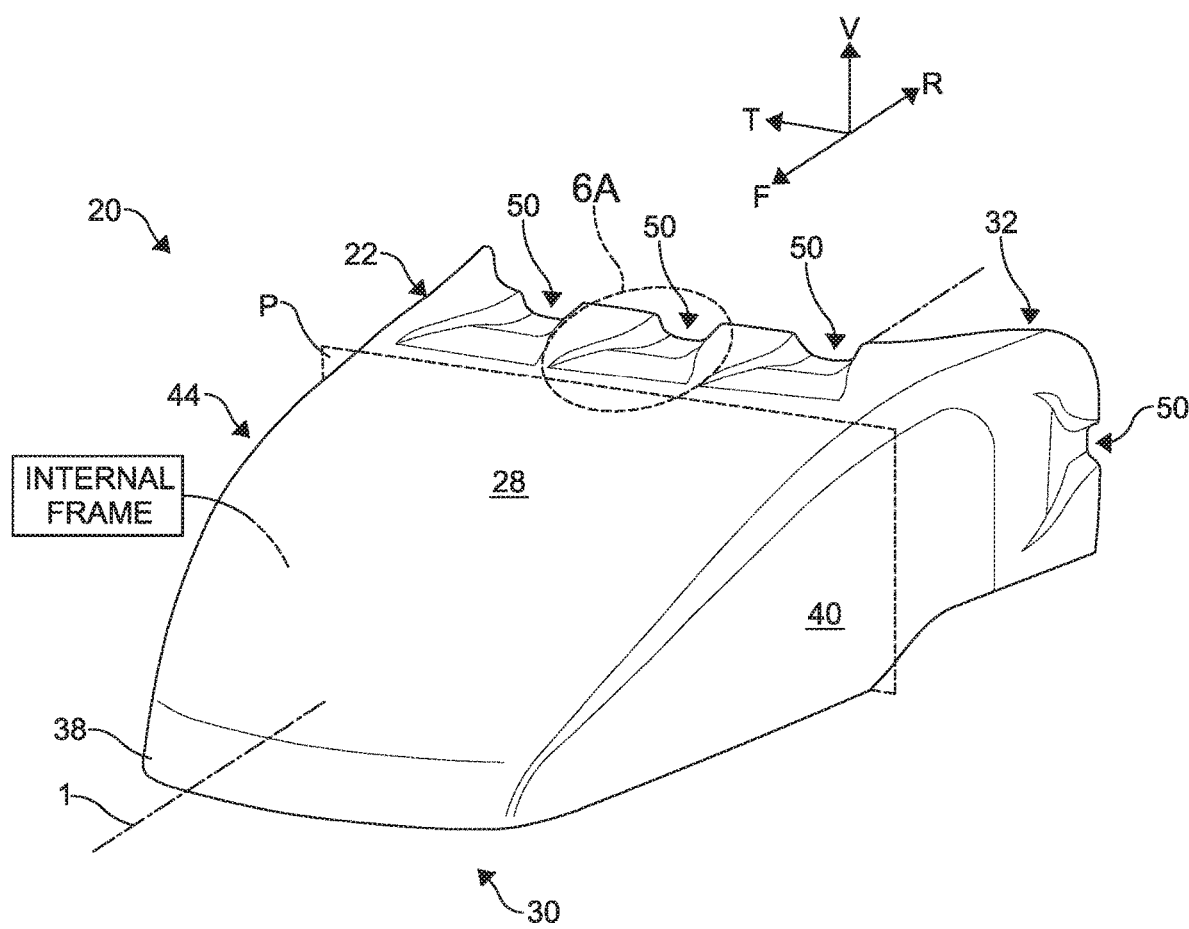
FIG. 3A is a top perspective view of the fairing illustrated in FIGS. 1 and 2.
Figure 3B:
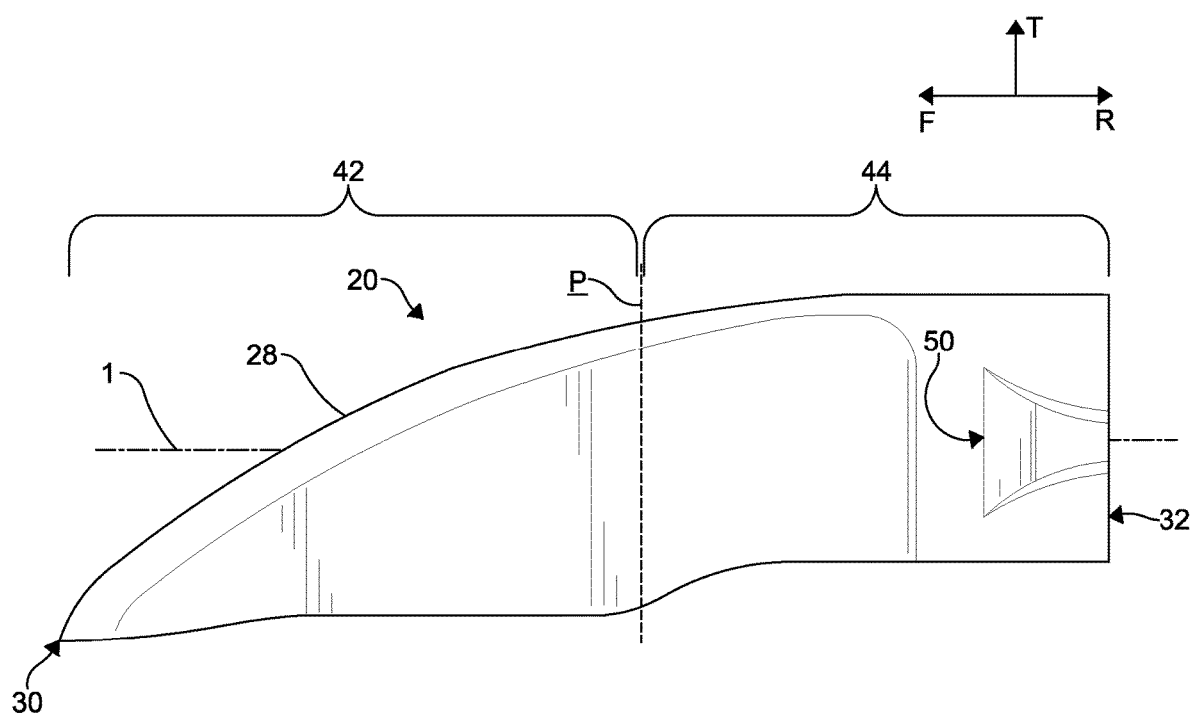
FIG. 3B is a side elevation view of the fairing illustrated in FIG. 3A.

Referring to FIG. 3A, the fairing 20 includes a flow directing body 22. The flow directing body 22 has a forward end 30, a trailing end 32 opposite the forward end 30 along the forward-rearward axis 1, a top 34 that extends from the forward end 30 to the trailing end 32, and a lower edge 36 configured to be adjacent to the roof 14 of the truck 2. The exterior surface 28, for example at the top 34 of the body, includes an upper surface that is generally planar and horizontal (or planar and horizontal) and a front surface continuous with the upper surface and extending away therefrom in a forward direction along a longitudinal axis. Generally planar may indicate that the surface may be planar on the whole, but not necessarily exactly or perfectly planar. Similarly, generally horizontal may indicate that the surface may be horizontal on the whole, but not necessarily exactly or perfectly horizontal. A description of generally planar or horizontal may include irregular deviations from a mostly flat surface (with respect to generally planar) or from a mostly horizontal surface (with respect to generally horizontal). The front surface slopes gradually to a front edge defined by the forward end. The forward end is shaped to conform to the roof of the truck. The flow directing body 22 further includes a first side wall 38, a second side wall 40 opposite to the first side wall 38 along the transverse direction T. As illustrated, the first side wall 38 and the second side wall 40 each extend from the top 34 toward the lower edge 36 along the vertical direction V. The first side wall 38 and the second side wall 40 can define a first side surface and a second side surface that are each continuous with the upper surface and the front surface of the top 34. The front surface and a portion of the first and second side surfaces can at least partially define a tapered forward section 42 (FIG. 3B). The upper surface and a portion of the first and second side surfaces can at least partially define a rearward section 44 that is disposed rearward of the tapered forward section 42.

Continuing with FIGS. 3A-3B, the flow directing body 22 includes a tapered forward section 42 and a rearward section 44 that is rearward of the tapered forward section 42 along the forward-rearward direction FR. As described above, the tapered forward section 42 tapers toward the forward end 30 along a vertical direction V. The tapered forward section 42 therefore has a thickness that increases in a direction toward the trailing end 32. In addition, the tapered forward section 42 has a fairing width 21W (21W shown in FIG. 5A) that increases in a direction toward the trailing end 32. The tapered forward section 42 can be said to include a) an inclined or sloped portion of the top 34, and b) forward tapered portions (not numbered) of the first side wall 38 and the second side wall 40.

As shown in FIGS. 3A and 3B, the tapered forward section 42 and the rearward section 44 can be said to be divided by a central plane P that is perpendicular to the forward-rearward direction FR, the first side wall 38, and the second side wall 40. The rearward section 44 extends from the central plane P to the trailing end 32. In accordance with the illustrated aspect, an entirety of each one of the plurality of flow channels 50 are disposed in the rearward section 44 rearward of the central plane P and terminate at the trailing end 32. It should be appreciated that in alternative aspects, the flow channels 50 could extend into a portion of the tapered forward section 42.

Continuing with FIGS. 3A-5B, the fairing 20 is sized to cover a substantial portion of the roof 14 of the truck 2. In accordance with the illustrated aspect, the lower edge 36 defines a footprint having a fairing length 21L (FIG. 4A) that extends from the forward end 30 to the trailing end 32 along the forward-rearward direction FR and a fairing width 21W (FIG. 5A) that extends from the first side wall 38 to the second side wall 40 along the transverse direction T. The fairing length 21L can extend from the upper end of truck windshield to the end of the cabin extender thus covering sleeping and storage quarters. In one example, the fairing length 21L is between 1.2 m and about 2.4 m. However, the fairing length 21L may fall outside of this range. In one example, the fairing width 21W may be slightly less than a width of a typical roof of a truck 2. The term "about" used in connection with a distance means plus or minus 5% of the referenced distance. Furthermore, the fairing width 21W can vary along the fairing length 21L such that the fairing width 21W at the forward end 30 is a smaller than the fairing width 21W at the trailing end 32.

Referring to FIGS. 3A-5B, the exterior surface 28 defines a plurality of flow channels 50a-50c that extend along the forward-rearward direction FR. The flow channels 50a-50c are each spaced from the forward end 30 of the flow directing body 22 and terminate at or near the trailing end 32 of the fairing 20. As shown in FIG. 3B, and described above, each flow channel 50a-50c is disposed rearward of the central plane P. The top 34 may include at least one flow channel 50a. The flow channels 50a along the top 34 may be referred to as top flow channels. In the illustrated aspect, the top 34 includes three flow channels 50a. There may be more than three or less than three top flow channels 50a as needed. Furthermore, the first side wall 38 may include at least one flow channel 50b and the second side wall 40 may include at least one flow channel 50c. The flow channels along the side walls 38 and 40 may be referred to as the side flow channels 50b and 50c. The flow channels 50a-50c along top 34 and side walls 38 and 40 may be substantially similar to each other. For ease of illustration only one flow channel is described below. A person of skill in the art will appreciate that there may be variations in dimensions and scale among the flow channels 50a-50c illustrated and described herein.

Figure 6A:
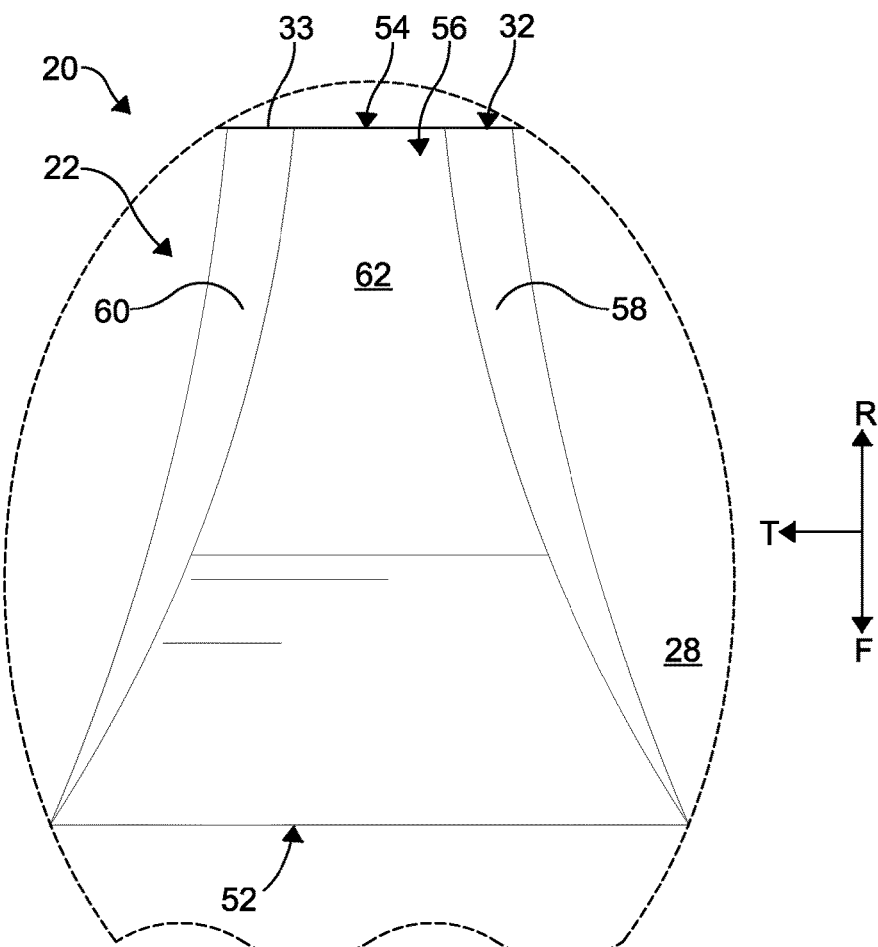
FIG. 6A is a detailed top view of a portion of the fairing illustrated in FIG. 3A.
Figure 6B:
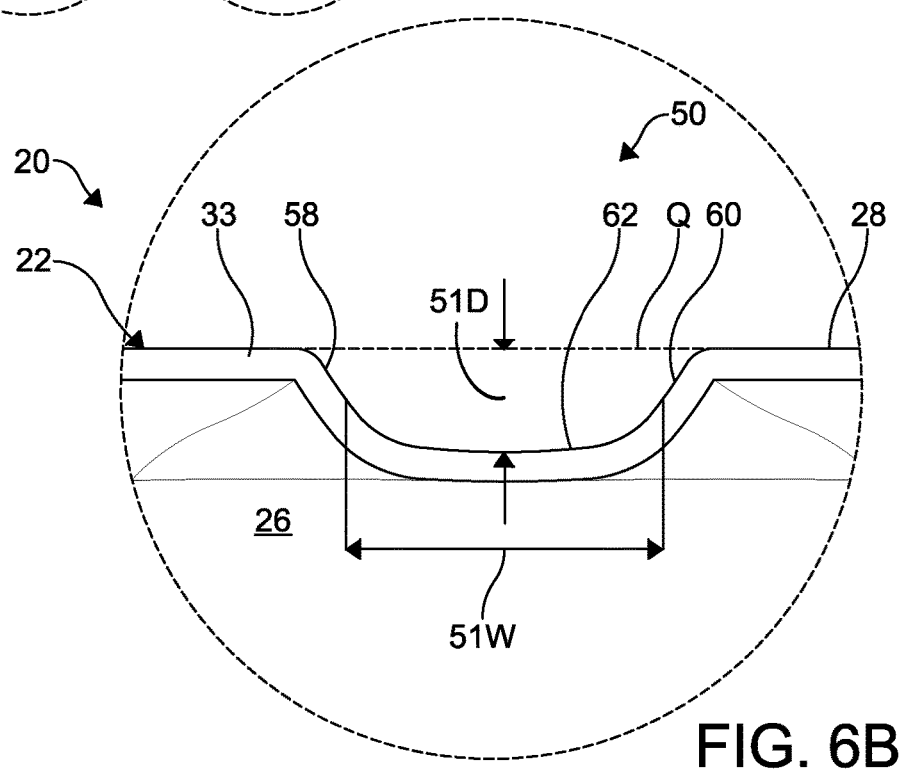
FIG. 6B is a detailed view of a portion of the trailing or rear end of the fairing illustrated in FIG. 5B.

Referring to FIGS. 6A and 6B, each flow channel 50 may include a venturi profile. A venturi profile may refer to a geometry of a portion, or at least a portion, of the fairing. For example, the venturi profile may include a geometry having at least a constriction. In some cases a venturi profile can have a converging conical portion or a linear portion, and a diverging recovery portion. Reference number 50 and 50a-50c are used interchangeably in the description of the flow channel that follows. As best shown in FIG. 6A, each flow channel 50 has a flow channel inlet 52, an outlet 54 spaced from the flow channel inlet 52 along the forward rearward direction FR, and a constriction 56 disposed rearward relative to the flow channel inlet 52. The constriction 56 increases the velocity of air flowing through the flow channel 50. The exterior surface 28 defines first and second channel sides 58 and 60 that are spaced apart with respect to each other along the transverse direction T, and a channel bottom 62. The channel sides 58 and 60 and bottom 62 at least partially define the flow channel 50. In one example, the channel bottom 62 can curve upwardly at or near the outlet of the flow channel. This upward curve can help better direct air flow upward toward an elevated front edge of the trailer.

Figure 4A:
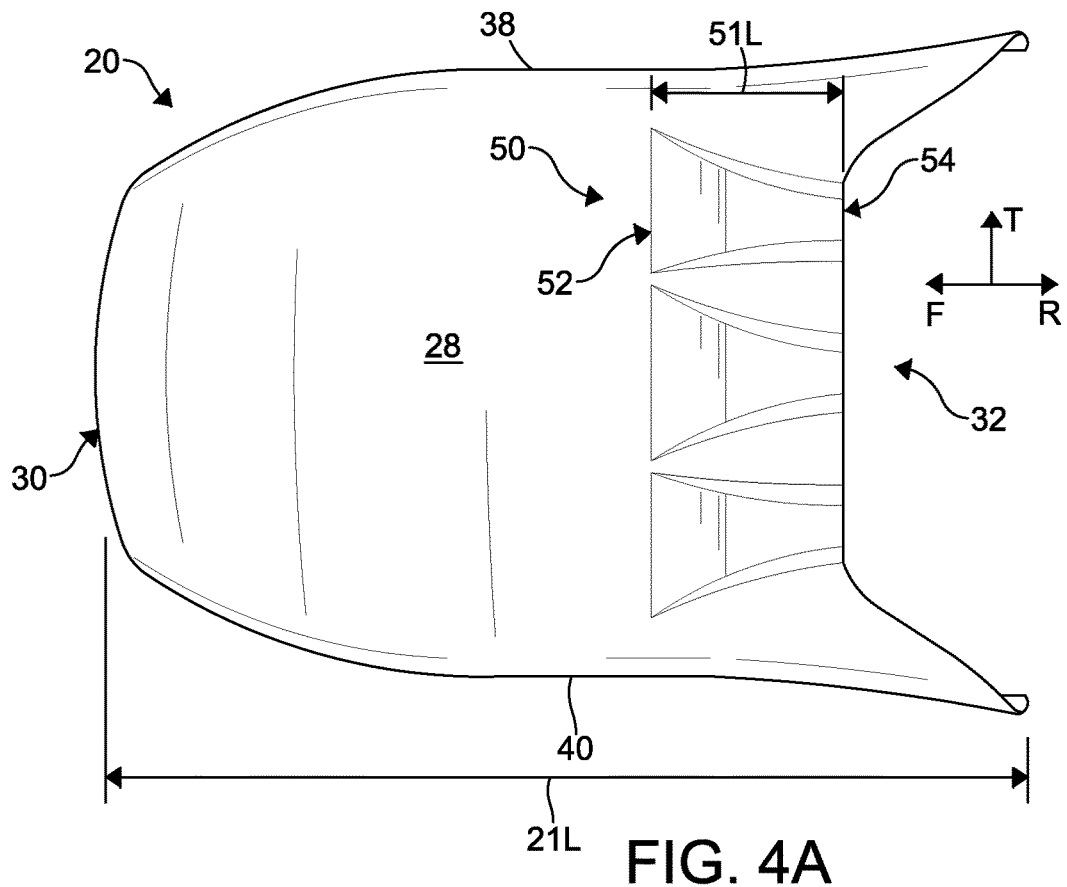
FIGS. 4A and 4B are top and bottom plan views, respectively, of the fairing illustrated in FIG. 3A.
Figure 4B:
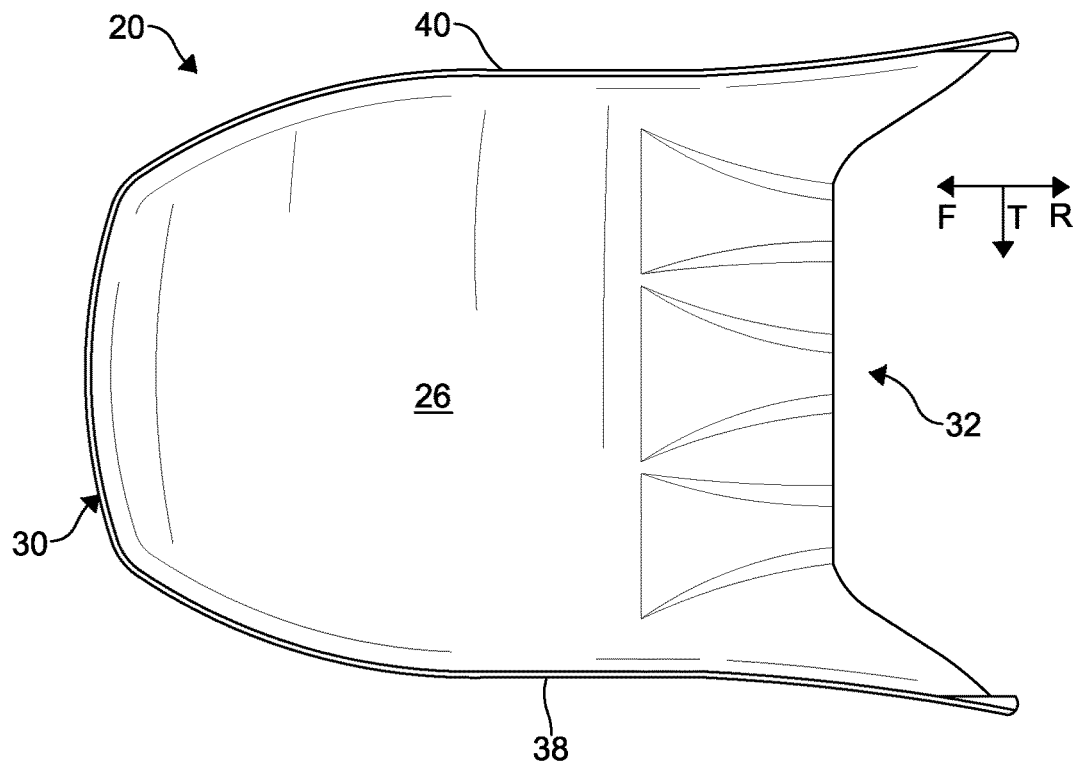
Figure 5A:
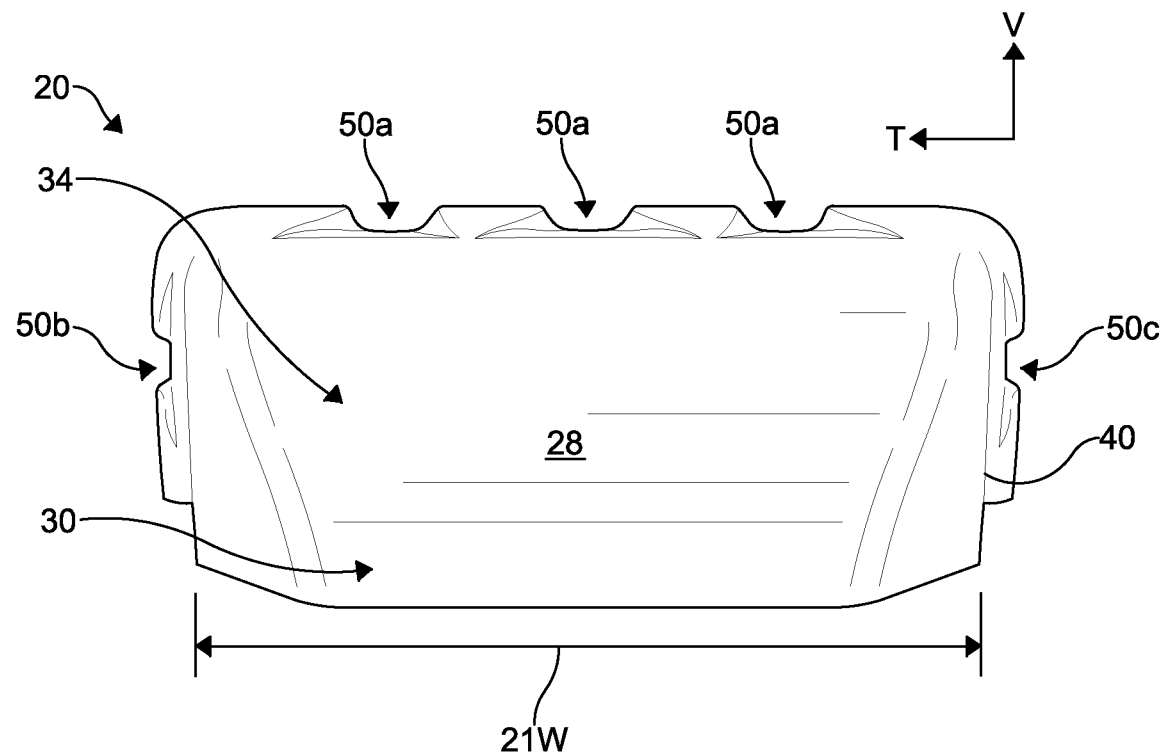
FIG. 5A is a front elevation view of the fairing illustrated in FIG. 3A.
Figure 5B:
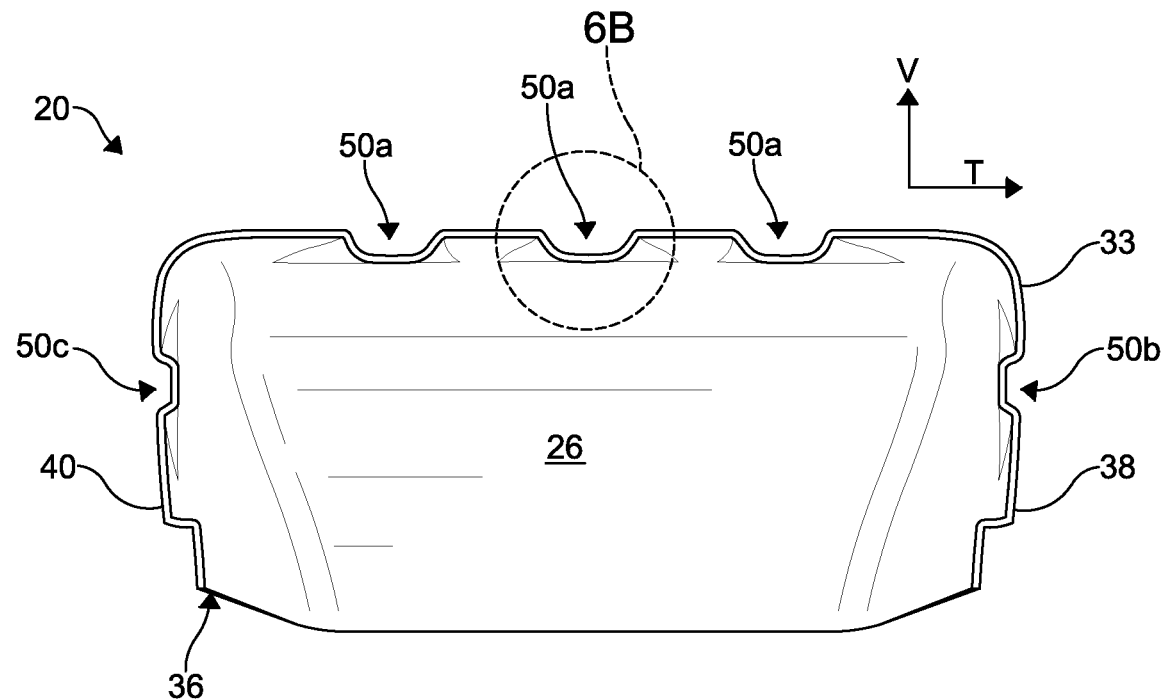
FIG. 5B is a rear elevation view of the fairing illustrated in FIG. 3A.

As shown in FIGS. 4A, 6A and 6B, each flow channel 50 is adapted to constrict air flow A passing through the flow channel 50. In accordance with the illustrated aspect, each flow channel 50 includes a constriction 56. At least portion of the flow channel 50 tapers as it extends along the forward-rearward direction FR to the trailing end 32.

Each flow channel 50 has a channel length 51L (FIG. 4A) that extends from the flow channel inlet 52 to the outlet 54 along the forward-rearward direction FR. The flow channel 50 also has a flow channel width 51W (FIG. 6B) that extends from the first side 58 to the second side 60 along the transverse direction T. The flow channel width 51W is perpendicular to the channel length 51L. The flow channel width 51W can decrease as the flow channel 50 extends to the outlet 54 (or trailing end 32). In the aspect shown, the flow channel 50 tapers along an entirety of the channel length 51L to define the constriction 56. The channel sides 58 and 60 can be curved as illustrated. Alternatively, all or a portion of the channel sides 58 and 60 can be linear or straight as they taper toward each other to define the constriction 56. As shown in FIG. 6B, the flow directing body 22 further defines a flow channel depth 51D that is perpendicular to the flow channel width 51W. The flow channel depth 51D extends from the bottom 62 of the flow channel 50 to a plane Q that is coplanar with the exterior surface 28 immediately adjacent to the flow channel 50. The flow channel depth 51D increases as the flow channel 50 extends along the forward-rearward direction FR to the trailing end 32, as best shown in FIG. 3A. Furthermore, the flow channel width 51W decreases along the flow channel depth 51D such that the flow channel 50 is more narrow toward the bottom 62.

A parameter that may be used to characterize the flow channel 50 illustrated in the figures is a channel width-to-channel depth ratio. In accordance with the illustrated aspect, the channel width to channel depth ratio is greater than 1.0. In one example, the channel width to channel depth ratio may be between 1.0 and 5.0 or, for example, between about 1.0 to about 5.0. The channel width to channel depth ratio, however, may be outside of this range. The term "about" when used in connection with the channel width to channel depth ratio is plus or minus 5% of the stated ratio. Furthermore, it can be seen that the flow channel 50 is designed to have a gradually constricting cross-sectional area as the flow channel extends from the flow channel inlet 52 to the outlet 54. The cross-sectional area as used in reference to the flow channel 50 is perpendicular to the forward-rearward direction FR and is the area bound by the side 58, the side 60, the bottom 62, and the plane Q.

The flow channels 50a-50c function according to the Venturi principle to help improve aerodynamics of the fairing 20. As shown in FIG. 6A, each flow channel 50 includes a constriction 56 that is rearward of the flow channel inlet 52. As air flow travels over the top 34 of the fairing 20 and enters the respective flow channel 50, the velocity of the air flow exiting the constriction 56, which is shown adjacent to a rearward most edge 33, is higher than the velocity of the air flow at the flow channel inlet 52 of the flow channel 50. Since the constriction 56 (as shown) is adjacent to the rearward most edge 33, which is proximate the gap 8 of the tractor-trailer 5 when in use, the pressure in the gap 8 may decrease, at least compared to the pressure at the flow channel inlet 52. In another example, the bottom surface 62 may curve upwardly proximate the rearward most edge 33 to facilitate directing the flows across the gap 8. Without being bound by any particular theory, it is believed that the plurality of flow channels 50a-50c, each of which include the constriction 56, accelerate the air flow through the channels 50a-50c and across the gap 8.

In accordance with aspects of the present disclosure, the fairing 20 may be constructed of any rigid material which can be formed into the desired shape and provide the desired functions as described herein. In one example, the flow directing body 22 of the fairing may comprise a metallic material, a polymeric material, laminate material, a composite material, or a combination comprising at least one of the foregoing. The flow directing body 22 may be a single sheet of material or a laminate of two more of the materials.

Exemplary polymer-based materials include polymeric materials, combinations of polymeric materials with elastomeric materials, and/or thermoset materials. In one aspect, the polymeric materials comprise thermoplastic polymeric materials. Possible thermoplastic polymeric materials include polybutylene terephthalate (PBT); acrylonitrile-butadiene-styrene (ABS) (CYCOLOY™ resins, commercially available from SABIC); polycarbonate (LEXAN™ and LEXAN™ EXL resins, commercially available from SABIC's Innovative Plastics business); polyethylene terephthalate (PET); polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide (NORYL GTX™ resins, commercially available from SABIC's Innovative Plastics business); blends of polycarbonate/PET/PBT; PBT and impact modifier (XENOY™ resins, commercially available from SABIC); polyamides (Nylon 6, Nylon 6-6, Nylon 6-9, Nylon 6-10, Nylon 6-12, Nylon 11, Nylon 12, Nylon 4-6, etc.); phenylene sulfide resins; polyvinyl chloride (PVC); high impact polystyrene (HIPS); polyolefins, e.g., low/high density polyethylene (L/HDPE), polypropylene (PP), expanded polypropylene (EPP); polyethylene (PE), thermoplastic olefins (TPO), as well as combinations comprising at least one of the foregoing.

Exemplary composites may be polyethylene (PE) and fiber composites; polypropylene and fiber composites (AZDEL Superlite™ sheets, commercially available from Azdel, Inc.); long fiber reinforced thermoplastics (VERTON™ resins, commercially available from SABIC); long glass fiber filled polypropylene resin (STAMAX™ resin also commercially available from SABIC), carbon fiber reinforced polymeric composites (CFRP), mineral fiber based composites, as well as combinations comprising at least one of the foregoing. Some possible reinforcing materials include fibers, such as glass, carbon, and so forth.

Various processes may be used to form the fairing 20 illustrated in FIGS. 1-6B. For example, various molding processes can be used to make the fairing 20 including, but not limited to, injection molding, thermoforming, compression molding, additive manufacturing, etc. In examples of fairings used for mid-cab or sleeper cabs where the footprint is relatively large, the flow directing body of the fairing 20 can be manufactured via thermoforming. In another example, the flow directing body can be vacuum formed.

As described above, the fairing 20 may optionally include the internal frame 24. The internal frame 24 provides structural support to the flow directing body 22 and can be attached directly to the roof 14 of the truck 2. The fairing 20 and the internal frame 24 may be attached to each other mechanically. In one example, the flow directing body 22 is attached to the internal frame 24 with mechanical fasteners. Mechanical fasteners may be, for example, bolts, screws, rivets, clamps, or other similar fasteners. Alternatively, the fairing 20 and the internal frame 24 may also be attached to each other chemically. In one example, the flow directing body 22 is attached to the internal frame 24 with an adhesive. The adhesive may be, for example, an epoxy. The fairing 20 and the internal frame 24 may also be attached to each other mechanically and chemically.

Fairings with internal frames 24 are typically used for trucks designed for longer hauls, such as trucks with mid-cabs and/or sleeper cabs. Such fairings cover larger footprints associated with mid-cabs and/or sleeper cabs and usually need added support to comply with safety protocols required by the truck manufacturer or governmental regulators. In some applications, the fairings atop mid-cabs and/or sleeper cabs are required to withstand forces caused by roll-overs. The internal frame 24, therefore, provides added structural support to the fairing 20 in certain aspects where a footprint over larger cabs is needed. In alternative aspects, however, the fairing 20 may not include such an internal frame. In such an alternative aspect, the fairing 20 may have smaller footprints suitable for day-cab type trucks. Accordingly, the internal frame 24 may be an optional component of the fairing 20.

The internal frame 24 can be constructed of any rigid material that can be formed into the desired shape and provide the desired properties. The internal frame 24 can include multiple rigid components coupled together to define a skeletal structure for the flow directing body 22. Attachment features such as fasteners, clamps, and the like may be included to secure the internal frame 24 to the roof 14 of the truck 2. In one example, the internal frame 24 may comprise a metallic material, a polymeric material, a laminate material, a composite material, or a combination comprising at least one of the foregoing. In one example, the internal frame 24 is a polymeric material that has been injection molded.

Exemplary materials for the internal frame 24 include polymeric materials, polymeric materials with elastomeric materials, elastomeric materials, and/or thermoset materials Exemplary materials can also include elastomeric materials or thermoset materials. In one aspect, the polymeric materials comprise thermoplastic polymeric materials. Possible thermoplastic polymeric materials include polybutylene terephthalate (PBT); acrylonitrile-butadiene-styrene (ABS) (CYCOLOY™ resins, commercially available from SABIC's Innovative Plastics business); polycarbonate (LEXAN™ and LEXAN™ EXL resins, commercially available from SABIC's Innovative Plastics business); polyethylene terephthalate (PET); polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide (NORYL GTX™ resins, commercially available from SABIC); blends of polycarbonate/PET/PBT; PBT and impact modifier (XENOY™ resins, commercially available from SABIC); polyamides (Nylon 6, Nylon 6-6, Nylon 6-9, Nylon 6-10, Nylon 6-12, Nylon 11, Nylon 12, Nylon 4-6, etc.); phenylene sulfide resins; polyvinyl chloride (PVC); high impact polystyrene (HIPS); polyolefins, e.g., low/high density polyethylene (L/HDPE), polypropylene (PP), expanded polypropylene (EPP); polyethylene (PE), thermoplastic olefins (TPO), as well as combinations comprising at least one of the foregoing.

Exemplary composites may be polyethylene (PE) and fiber composites; polypropylene and fiber composites (AZDEL Superlite™ sheets, commercially available from Azdel, Inc.); long fiber reinforced thermoplastics (VERTON™ resins, commercially available from SABIC's Innovative Plastics business); long glass fiber filled polypropylene resin (STAMAX™ resin also commercially available from SABIC), carbon fiber reinforced polymeric composites (CFRP), mineral fiber based composites, as well as combinations comprising at least one of the foregoing. Some possible reinforcing materials include fibers, such as glass, carbon, and so forth.

Figure 7:
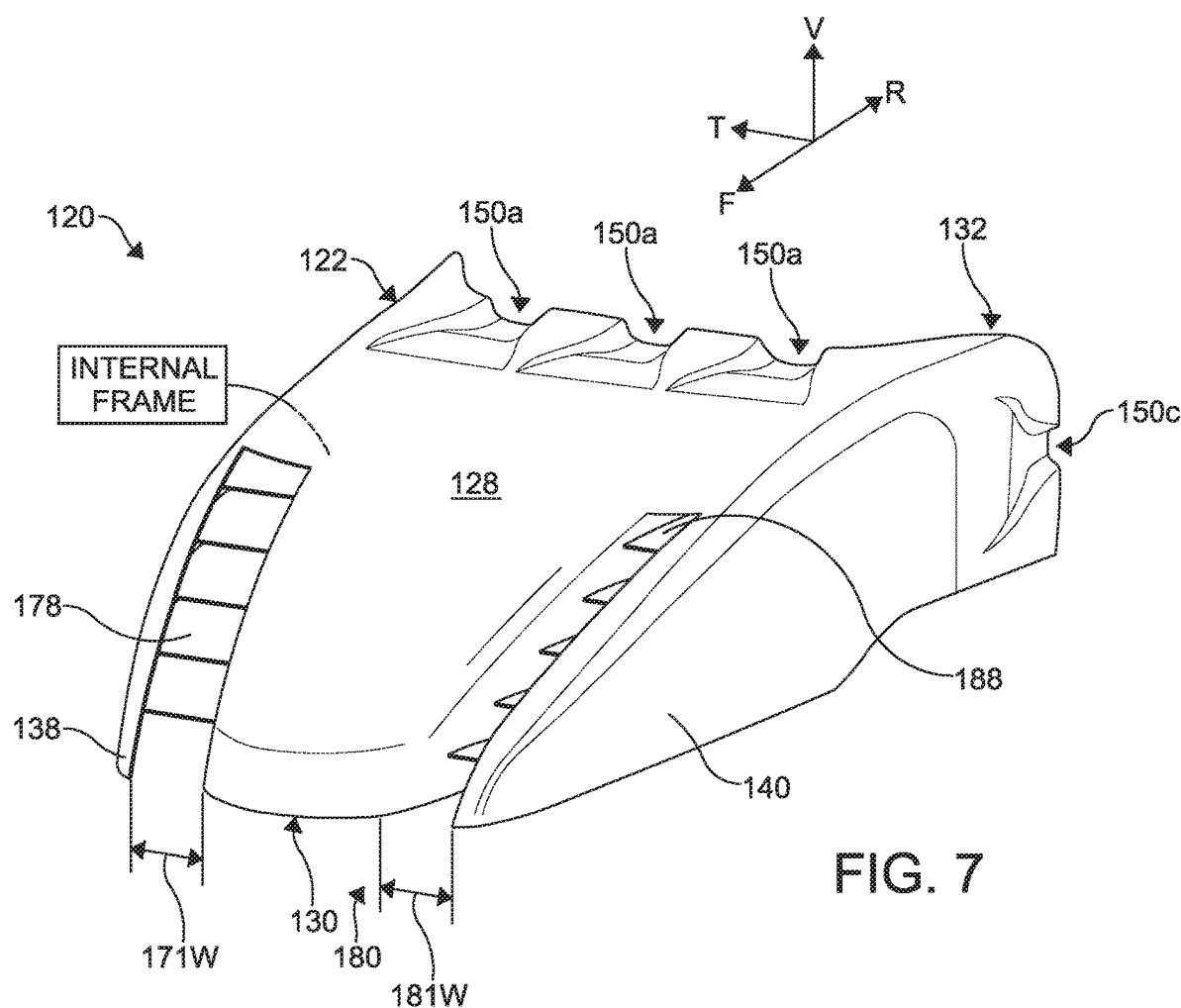
FIG. 7 is a top perspective view of a fairing according to another aspect.
Figure 8:
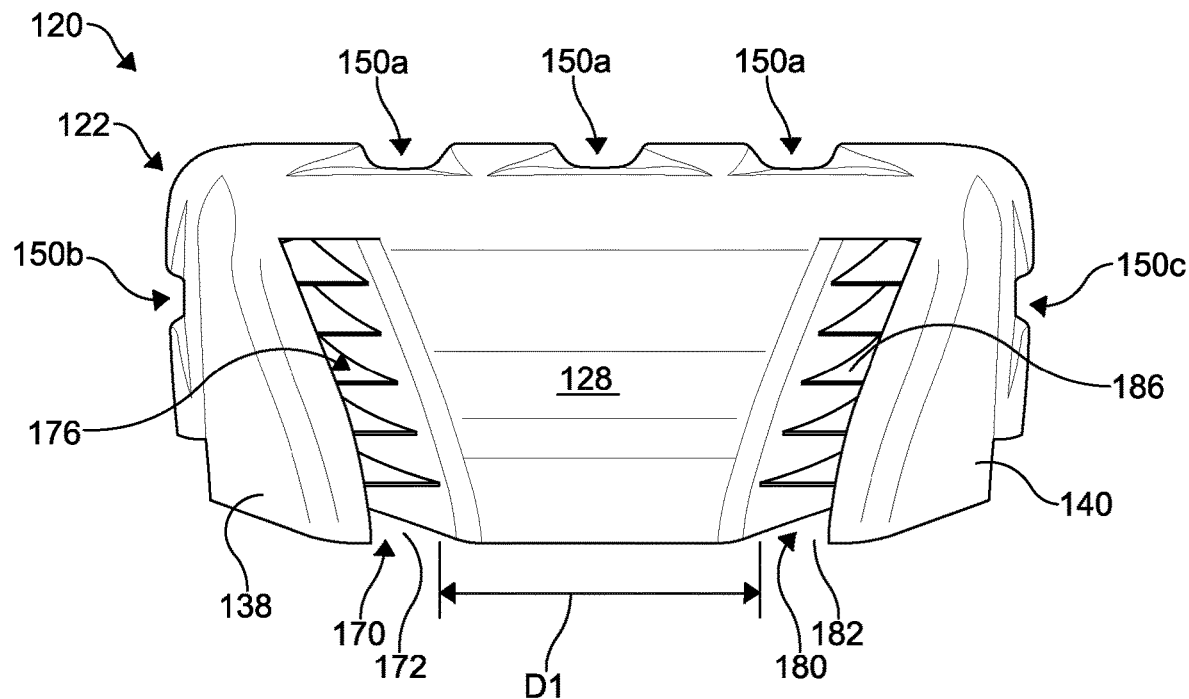
FIG. 8 is a front elevation view of the fairing illustrated in FIG. 7.
Figure 9:
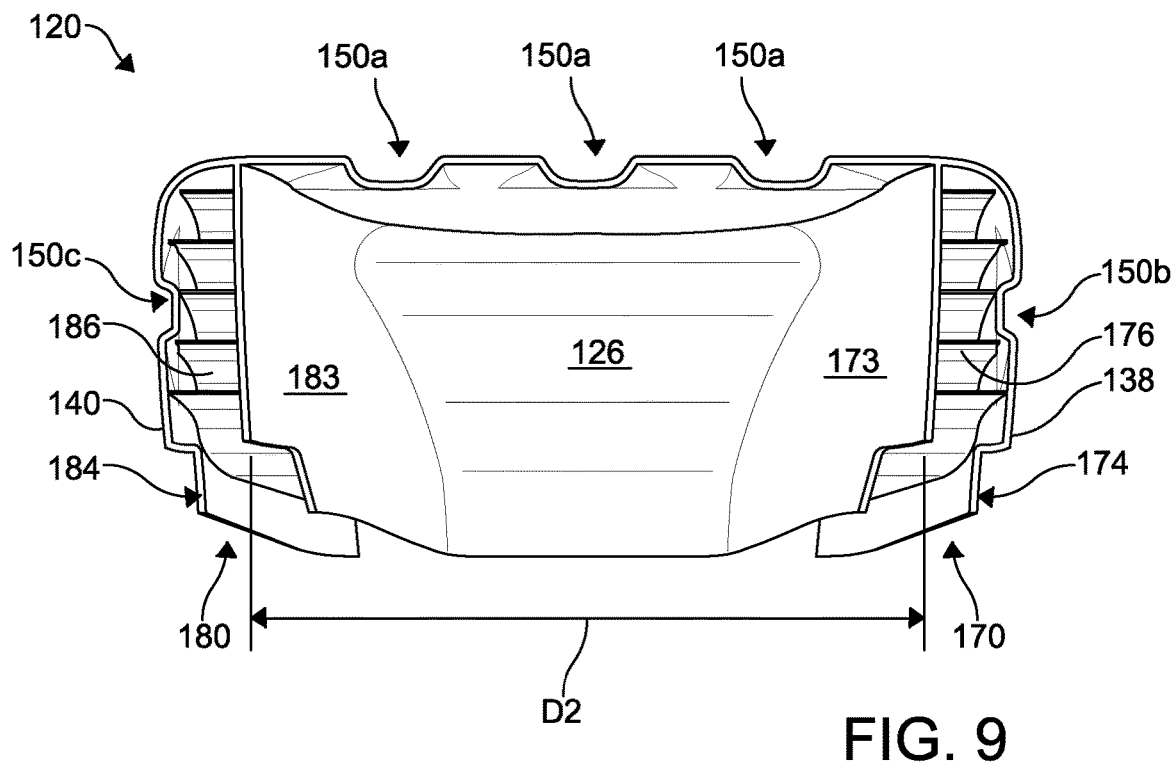
FIG. 9 is a rear elevation view of the fairing illustrated in FIG. 7.

FIGS. 7-9 illustrate an alternative aspect of a fairing in accordance with the inventive concepts described herein. As shown in FIG. 7, a fairing 120 is shown that is designed to attach to top of the truck 2. The fairing 120 shown in FIGS. 7-9 is substantially similar to the fairing 20 shown in FIGS. 1-6B and described above. Accordingly, the same reference numbers will be used to identify features that are common to the fairing 120 illustrated in FIGS. 7-9 and the fairing 20 illustrated in FIGS. 1-6B. The difference between the fairing 120 illustrated in FIGS. 7-9 and the fairing 20 illustrated in FIGS. 1-6B is that the fairing 120 includes a plurality of air ducts 170, 180 that extend through the fairing 120. The air ducts 170, 180 are described below. Most, if not all of the remaining features of the fairing 20 and the fairing 120 are similar.

As shown in FIG. 7, the fairing 120 includes a flow directing body 122 having an exterior surface 128 and an interior surface 126. The flow directing body 122 has a forward end 130, a trailing end 132 opposite the forward end 130 along the forward-rearward direction FR, a top 134 that extends from the forward end 130 to the trailing end 132, and a lower edge 136 configured to be adjacent to the roof 14 of the truck 2. The flow directing body 122 further includes a first side wall 138, a second side wall 140 opposite to the first side wall 138. The exterior surface 128 defines a plurality of flow channels 150a-150c that extend along the forward-rearward direction FR. As shown, the top 134 may include at least one flow channel 150a. The flow channels along the top 134 may be referred to as top flow channels. In the illustrated aspect, the top 134 includes three flow channels 150a. More than three or less than three flow channels 150a may be present. Furthermore, the first side wall 138 may include at least one flow channel 150b and the second side wall 140 may include at least one flow channel 150c. The flow channels along the side walls 138 and 140 may be referred to as the side flow channels 150b-150c. The flow channels 150 along top 134 and side walls 138 and 140 may be substantially similar to each other. Furthermore, flow channels 150 are substantially similar to the flow channels 50 described above and illustrated in FIGS. 1-6B.

In accordance with the alternative aspect illustrated in FIGS. 7-9, the fairing 120 includes a first air duct 170 that is inboard of the first side wall 138 and a second air duct 180 that is inboard of the second side wall 140. The first air duct 170 and the second air duct 180 may be a lumened components that define first and second internal flow passages 176 and 186, respectively. The first air duct 170 and the second air duct 180 each may extend from the forward end 130 to the trailing end 132 through the flow directing body 122. As illustrated, the first air duct 170 may include an outer casing 173 and at least one vane 178 within the outer casing 173. The second air duct 180 may include an outer casing 183 and at least one vane 188 with in the outer casing 183. The first and second outer casings 173 and 183 may define first and second flow passages 176 and 186, respectively. Each outer casing 173, 183 can be secured to the flow directing body 122. For instance, the outer casing 173, 183 and the flow directing body 122 are attached to each other mechanically. In one example, the outer casing 173, 183 is attached to the flow directing body 122 with mechanical fasteners. Mechanical fasteners may be, for example, bolts, screws, rivets, clamps, or other similar fasteners. Alternatively, the outer casing 173, 183 is attached to the flow directing body 122 chemically. In one example, the outer casing 173, 183 is attached to the flow directing body 122 with an adhesive. The adhesive may be, for example, an epoxy. The outer casing 173, 183 may also be attached to the flow directing body 122 mechanically and chemically. Furthermore, the first side wall 138 and the second side wall 140 may define a portion of the first and second outer casings 173 and 183. Alternatively, the first and second outer casings 173 and 183 can be attached to the first and second side wall 138 and 140, respectively.

In accordance with the illustrated aspect, each air duct 170, 180 may include a plurality of vanes 178, 188 that are spaced apart with respect to each other along the vertical direction V. As shown, each vane 178, 188 extends along an entirety of the respective air duct 170, 180.

Referring to FIGS. 7-9, and in accordance with the illustrated aspect, the first and second air ducts 170 and 180 may be sized and dimensioned to taper toward the trailing end 132 of the fairing 120. The first air duct 170 has an inlet end 172 proximate the forward end 130 of the flow directing body 122, an outlet end 174 that is aligned with the trailing end 132 of the flow directing body 122, and an internal passage 176 that extends from the inlet end 172 to the outlet end 174. The internal passage 176 includes a passage width 171W that is perpendicular to the forward rearward direction FR. As illustrated, the passage width 171W decreases toward the trailing end 132 of the flow directing body. Likewise, the second air duct 180 has an inlet end 182 proximate the forward end 130 of the flow directing body 122, an outlet end 184 that is aligned with the trailing end 132 of the flow directing body 122, and an internal passage 186 that extends from the inlet end 182 to the outlet end 184. The internal passage 186 includes a passage width 181W that is perpendicular to the forward rearward direction FR. As illustrated, the passage width 181W decreases toward the trailing end 132 of the flow directing body 122.

Referring to FIGS. 7-9, the first and second air ducts 170 and 180 are arranged to guide air flow from the forward end 130 toward the lateral sides of the trailer 4 (not shown) around the gap 8. As shown in FIGS. 7-9, the first and second air ducts 170 and 180 are tapered or biased toward each other near the forward end 130 and spaced further apart from each other proximate the trailing end 132. For instance, the inlet ends 172 and 182 are spaced apart with respect to each other a first distance D1 and the outlet ends 174 and 184 are spaced apart with respect to each other a second distance D2 that is greater than the first distance D1. Thus, the orientation direction of the first and second air ducts 170 and 180 can generally follow the orientation of the first side wall 138 and the second side wall 140.

The first and second air ducts 170 and 180 may comprise a rigid material. For example the materials that form the first and second air ducts 170 and 180 may include a polymeric material, a composite material, a laminate material or a combination comprising at least one of the foregoing, that can be formed into the desired shape and provide the desired properties. In one example, each air duct 170, 180 can be formed with a combination of injection molded parts and thermoformed parts. In one example, each air duct includes an outer casing that is an injection mold part. The outer casing can therefor include any polymeric material, including the thermoplastics and/or thermosets described above. The vanes 178, 188 can be constructed of any rigid material. In one example, the vanes 178, 188 may comprise a metallic material, a polymeric material, a composite material, a laminate material, or a combination comprising at least one of the foregoing, that can be formed into the desired shape and provide the desired properties. In one example, the vanes 178, 188 can be thermoformed materials.

Fairings made in accordance with principles as described herein were evaluated using computational fluid dynamics (CFD) to determine the effect of the flow channels as described herein would have on aerodynamic drag. The evaluation includes comparing the air flow around a baseline fairing design with the fairing 20 as shown in FIGS. 3-6B. The baseline fairing design was structurally similar to the fairing 20 but did not include any of the flow channels 50a-50c that are present in fairing 20. Table 1 below summarizes coefficient of drag (Cd) with air flow impinging the tractor-trailer 5 with a 6° yaw.

TABLE 1

Coefficient of drag for tractor-trailer.

| Aspect | 6° yaw Cd |
|---|---|
| Baseline Fairing | 0.499 |
| Fairing 20 | 0.487 |

As can be seen table 1, the coefficient of drag (Cd) at 6° yaw is lower for the fairing 20 compared to the baseline fairing design. Yaw may describe oscillation of a vehicle or body about a vertical axis. As used herein, yaw, or yaw direction, may refer to the direction of air flow or winds impinging the truck. The yaw direction may be a degree of offset with respect to a truck centerline CL that is horizontal to the road surface. A "0° yaw" or "zero yaw" may be aligned with the truck centerline CL. A positive yaw angle may indicate a direction offset toward the right of the centerline CL. A negative yaw angle may indicate a direction offset toward the left of the centerline CL. The data indicates some positive impact on drag when incorporating the flow channels 50a-50c into a fairing as disclosed herein. Further analysis indicated that modifying the flow channel depth 51D and flow channel width 51W could also impact drag properties. Furthermore, there may be differences in how the flow channels influence drag based their locations along the top 34, 140 and or the first side walls 38, 138 and second side 40, 140. Accordingly, aspects of the present disclosure include fairings with top flow channels 50a, 150a. Other aspects may include fairings 20, 120 with side flow channels 50b-50c, 150b-150c. And still other aspects may include both top flow channels and side flow channels.

Figure 10A:
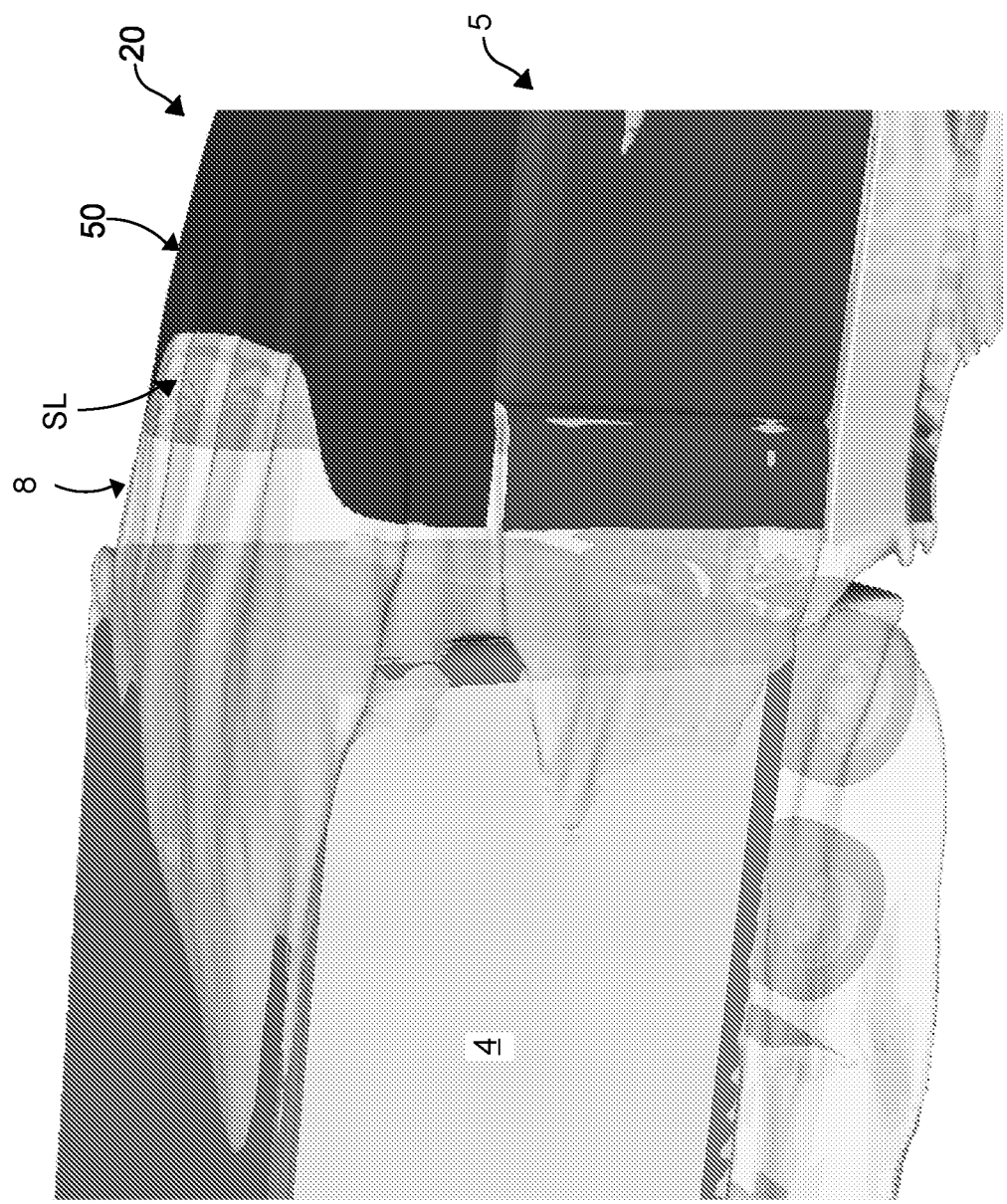
FIGS. 10A and 10B are left and right perspective views, respectively of a fairing on a tractor trailer illustrating iso-surfaces for total pressure (T=0)
Figure 10B:
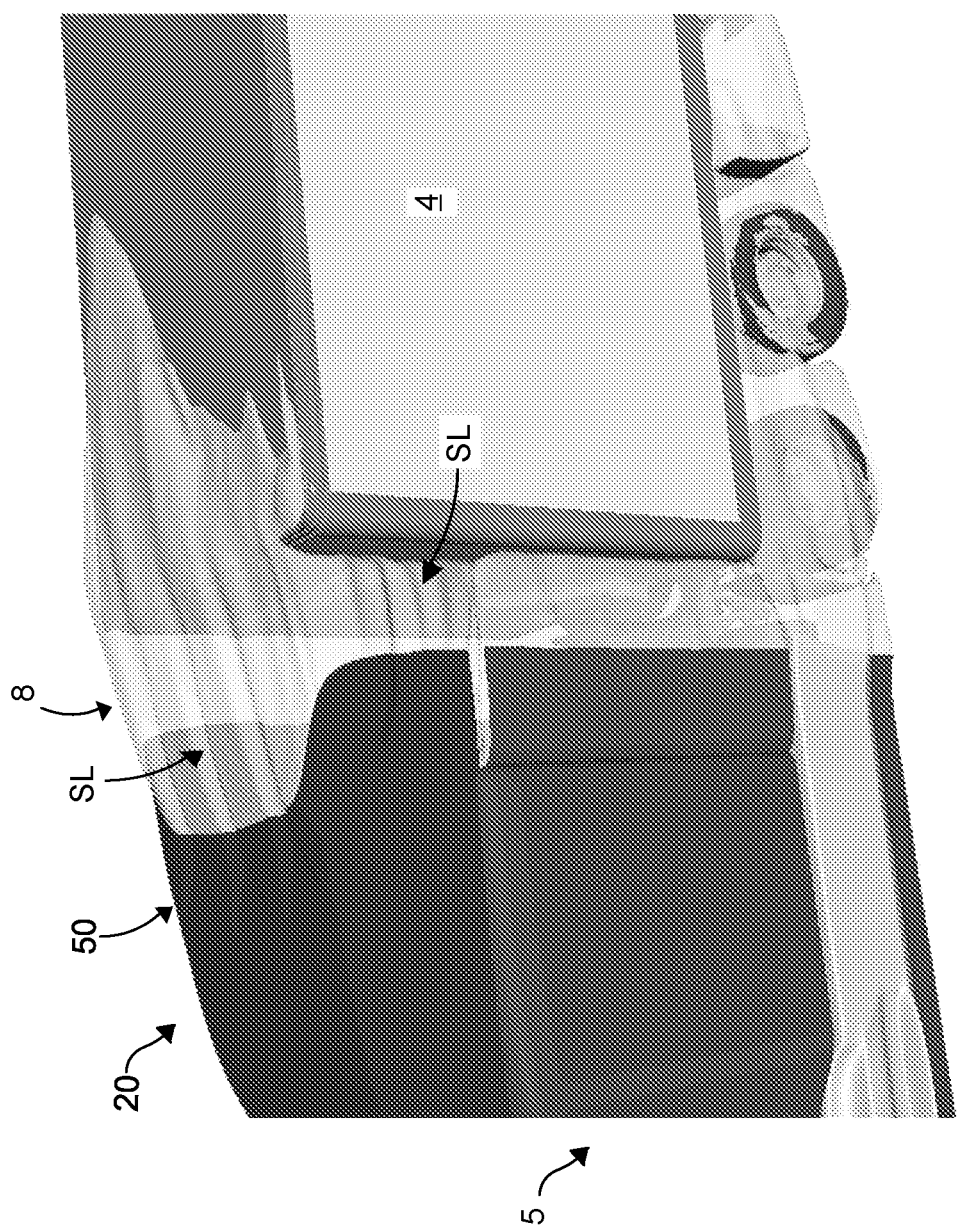

FIGS. 10A and 10B are left and right perspective views, respectively, of the fairing 20 on a tractor-trailer 5 illustrating the iso-surfaces of total pressure (equal to zero) at 0° yaw. As can be seen in FIGS. 10A and 10B there is illustrated reduced, or streamlined wake structures SL exiting the flow channels 50 across the gap 8 and extending toward the upper edge of the trailer 4. Although not shown, a fairing without flow channels 50 would not exhibit streamlined wake structures SL at the rear of the fairing that cross the gap 8.

FIGS. 11A-11C are top perspective views of the fairing on a tractor trailer illustrating magnitude of velocity sliced along three different planes that are normal to the upper surface of the fairing 20. FIG. 11A illustrates the velocity magnitude at the left side of the fairing. The region 51 in FIG. 11A has areas of lower velocity magnitude compared to the side of the fairing forward of the region 51 and the top of the fairing. It is believed the flow channel (not shown) at the side of fairing 20 contributes to the reduced velocity magnitude area shown within region 51 in FIG. 11A. FIG. 11B illustrates velocity magnitude a plane that divides a central flow channel on the top of fairing. The identified region S2 illustrates flow separation along surface of the flow channel and flow paths directed toward the upper edge of the trailer 4. FIG. 11C illustrates the velocity magnitude at the right side of the fairing 20.

FIG. 12A is a top perspective view of the fairing on a tractor trailer illustrating a map of static pressure (Cp) along the upper surface of fairing 20. The region S3, which includes the flow channels 50, has a lower static pressure compared to forward portions of the fairing 20. In this example, the static pressure along the flow channels can range between −0.1 and 0.2 or between about −0.1 and about 0.2.

Figure 13A:
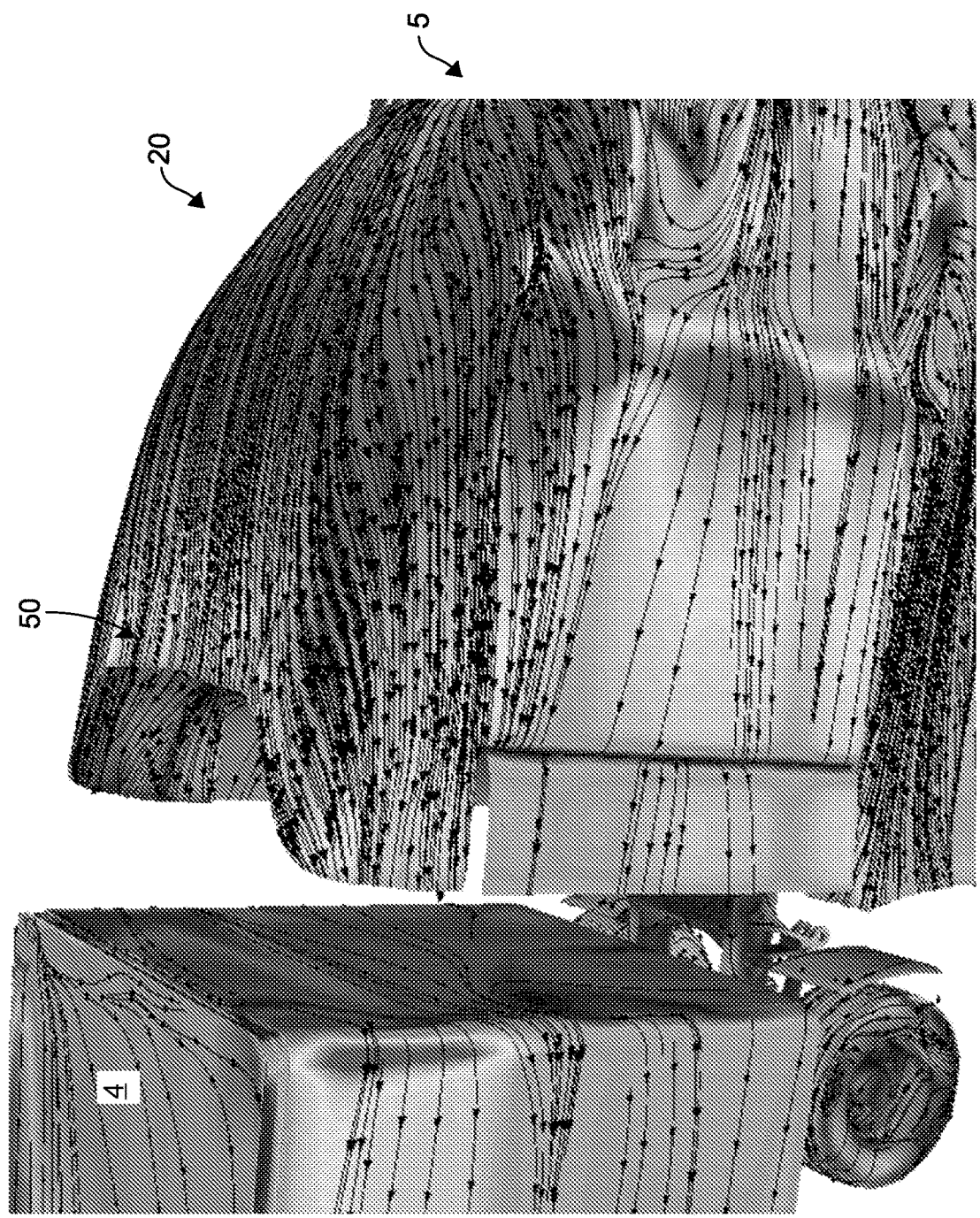
Figure 13C:
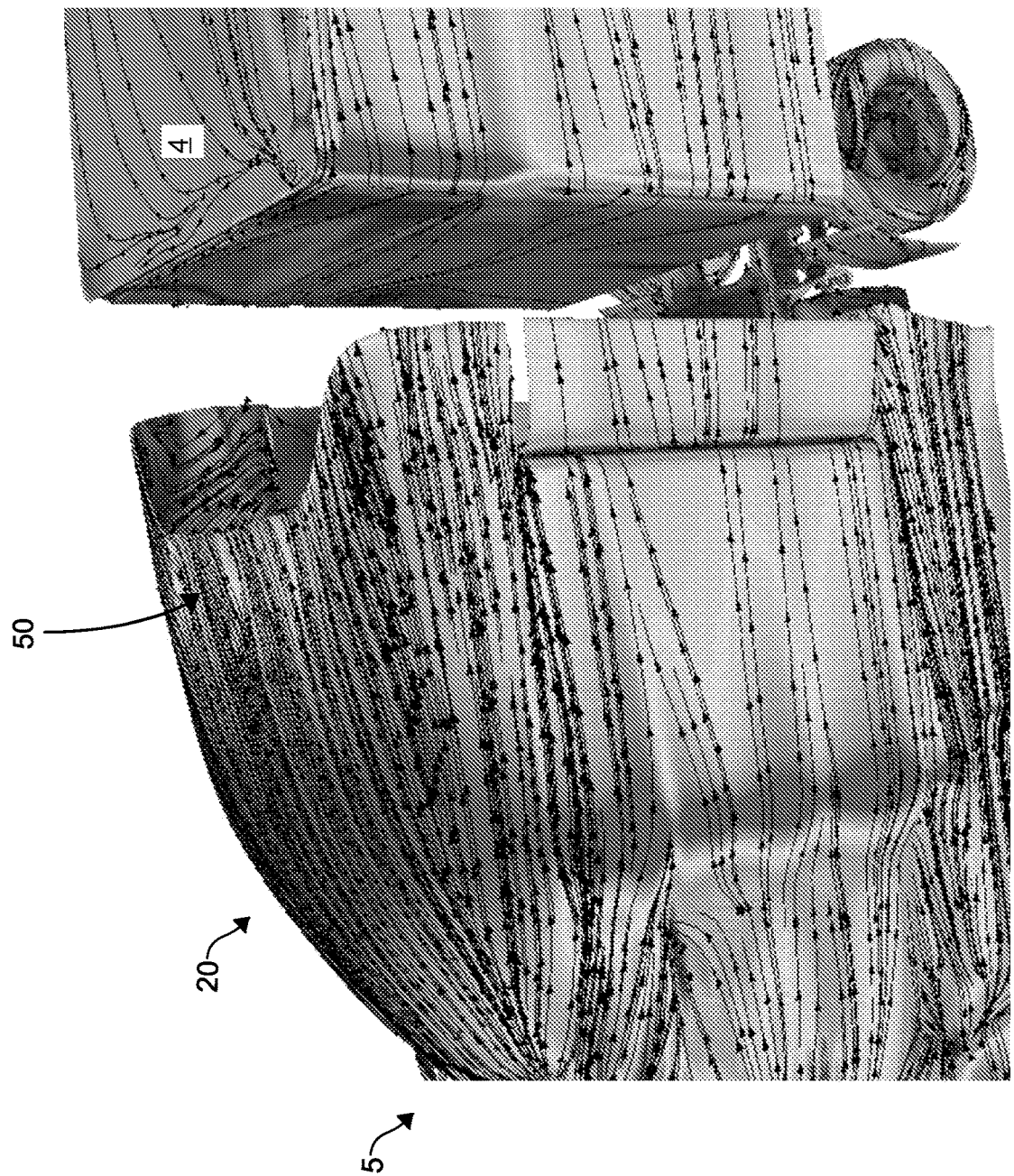
Figure 13D:
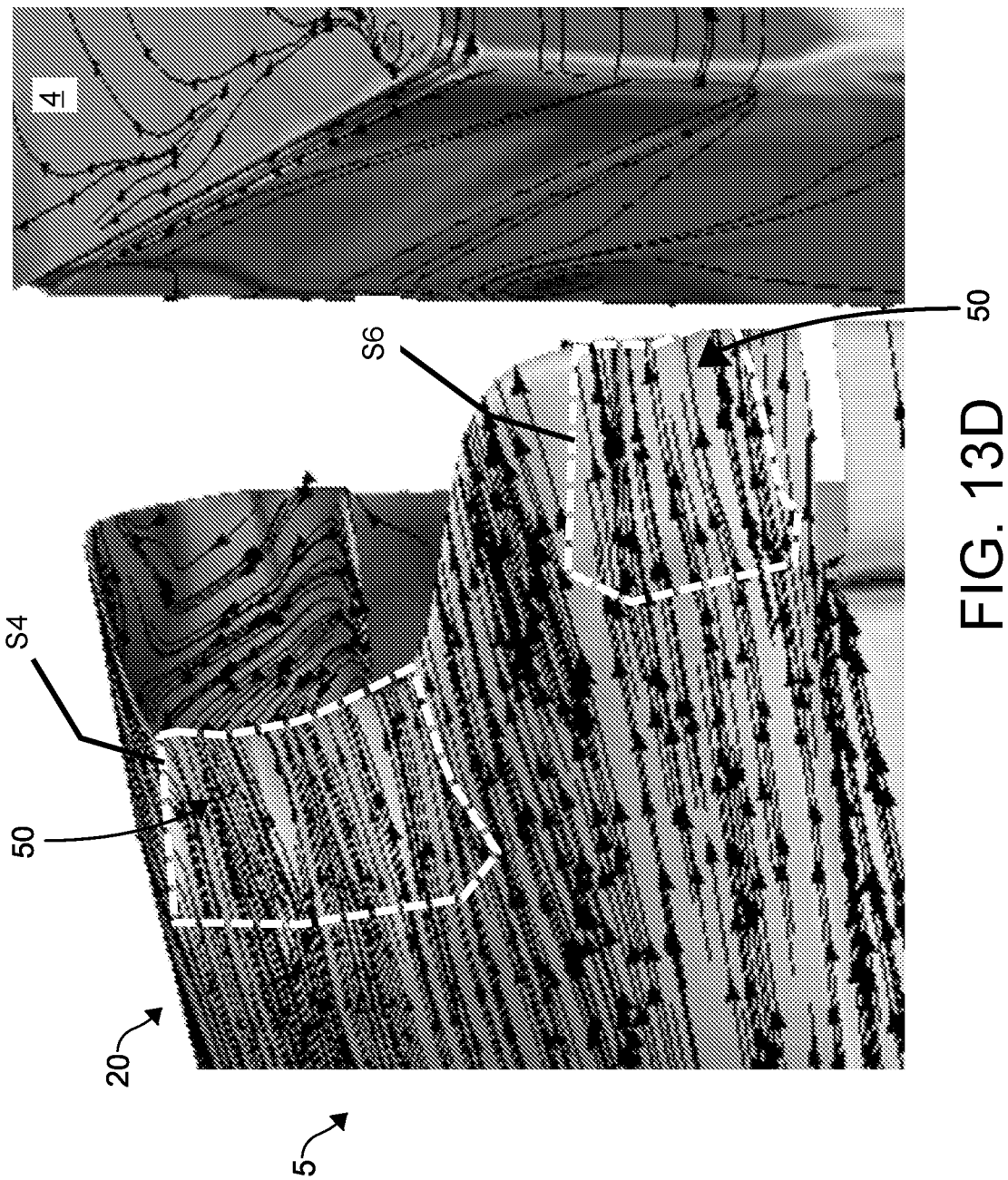

FIGS. 13A-13D illustrate surface velocity maps along an exterior surface of the fairing 20. FIGS. 13A and 13B are perspective views of the right side of the tractor-trailer 5, with FIG. 13B being a detailed view of the fairing shown in FIG. 13A. FIGS. 13C and 13D are perspective views of the left side of the tractor-trailer, with FIG. 13D being a detailed view of the fairing shown in FIG. 13C. As best shown in FIGS. 13B and 13D, the top region S4 includes top flow channels 50 and first and second side regions S4 and S5 that includes first and second side flow channels. The regions S4, S5, and S6 have a lower surface velocity than areas of the fairing forward of the flow channels while also have more directed flows through each channel.

The fairings as disclosed here include at least the following aspects:

Aspect 1A: A roof fairing for a vehicle comprises a flow directing body. The flow directing body comprises a forward end, a trailing end opposite the forward end along a forward-rearward axis, a top that extends from the forward end to the trailing end and is coupled between the forward end and the trailing end, a lower edge that extends from the forward end the trailing end and configured to be disposed along the roof of the vehicle, a first side wall extending from the top toward the lower edge, and a second side wall opposite to the first side wall and extending from the top toward the lower edge. The exterior surface of the flow directing body defines a plurality of flow channels sunk into the flow directing body and that extend generally along the forward-rearward axis, with each of the plurality of flow-channels spaced apart from the forward end and terminating at the trailing end, the flow channels comprising a venturi construction.

Aspect 1B: A roof fairing for a vehicle, the roof fairing consisting essentially of: a flow directing body. The flow directing body comprises a forward end, a trailing end opposite the forward end along a forward-rearward axis, a top that extends from the forward end to the trailing end and is coupled between the forward end and the trailing end, a lower edge that extends from the forward end the trailing end and configured to be disposed along the roof of the vehicle, a first side wall extending from the top toward the lower edge, and a second side wall opposite to the first side wall and extending from the top toward the lower edge. The exterior surface of the flow directing body defines a plurality of flow channels sunk into the flow directing body and that extend generally along the forward-rearward axis, with each of the plurality of flow-channels spaced apart from the forward end and terminating at the trailing end, the flow channels comprising a venturi construction.

Aspect 1C: A roof fairing for a vehicle, the roof fairing consisting of: a flow directing body. The flow directing body comprises a forward end, a trailing end opposite the forward end along a forward-rearward axis, a top that extends from the forward end to the trailing end and is coupled between the forward end and the trailing end, a lower edge that extends from the forward end the trailing end and configured to be disposed along the roof of the vehicle, a first side wall extending from the top toward the lower edge, and a second side wall opposite to the first side wall and extending from the top toward the lower edge. The exterior surface of the flow directing body defines a plurality of flow channels sunk into the flow directing body and that extend generally along the forward-rearward axis, with each of the plurality of flow-channels spaced apart from the forward end and terminating at the trailing end, the flow channels comprising a venturi construction.

Aspect 2: The roof fairing of any of aspects 1A-1C, wherein at least a portion of each flow channel tapers toward the trailing end of the flow direction body.

Aspect 3: The roof fairing of any of aspects 1A-C or aspect 2, wherein each flow channel has an inlet that is spaced apart from the forward end of the flow directing body, an outlet that is aligned with the trailing end, and a constriction disposed rearward relative to the inlet.

Aspect 4: The roof fairing of any one of aspects 1A-3, wherein each flow channel has a width that is perpendicular to the forward-rearward axis, wherein the width decreases as the flow channel extends to the trailing end.

Aspect 5: The roof fairing of any one of aspects 1A-4, wherein each flow channel has a depth that is perpendicular to a width of the flow channel, wherein the depth increases as the flow channel extends along the forward-rearward axis to the trailing end.

Aspect 6: The roof fairing of any one of aspects 1A-5, wherein each flow channel has a width that is perpendicular to the forward-rearward axis, and a depth that is perpendicular to the width, wherein the width decreases along the depth.

Aspect 7: The roof fairing of any one of aspects 1A-6, wherein each flow channel has a width to depth ratio that is at least 1.0 or at least about 1.0.

Aspect 8: The roof fairing of any aspect 6 or aspect 7, wherein the width to depth ratio of the flow channels is between 1.0 and 5.0 or between about 1.0 and about 5.0.

Aspect 9: The roof fairing of any one of aspects 1A-8, wherein the plurality of flow channels include a) at least one top flow channel disposed along the top of the flow directing body, b) at least one first side flow channel disposed along the first side wall, and c) at least one second side flow channel disposed along the second side wall.

Aspect 10: The roof fairing of any one of aspects 1A-9, wherein the plurality of flow directing channels are top flow directing channels disposed along the top of the flow directing body.

Aspect 11: The roof fairing of any one of aspects 1A-10, wherein the plurality of flow directing channels are side flow directing channels disposed along the first side wall and the second side wall.

Aspect 12: The roof fairing of any one of aspects 1A-11, wherein the flow directing body includes a tapered forward section and a rearward section that is rearward of the tapered forward section along the forward-rearward axis, wherein an entirety of each of the flow directing channels are disposed along the rearward section.

Aspect 13: The roof fairing of aspect 12, wherein the tapered forward section tapers toward the forward end along a) a vertical direction that is perpendicular to the forward-rearward axis, and b) a transverse direction that is perpendicular to the vertical direction and the forward-rearward axis.

Aspect 14: The roof fairing of any one of aspects 1A-13, wherein each of the plurality of flow directing channels are disposed rearward of a plane that divides the flow directing body into the tapered forward section and the rearward section, wherein the plane is perpendicular to the forward-rearward axis and the first and second side walls.

Aspect 15: The roof fairing of any one of aspects 1A-14, wherein the bottom defines a footprint having a fairing length that extends from the forward end to the trailing end along the forward-rearward axis and a fairing width that extends from the first side wall to the second side wall along a transverse direction that is perpendicular to the forward-rearward axis, wherein the fairing length is greater or equal to the fairing width.

Aspect 16: The roof fairing of aspect 15, wherein the fairing length is between about 1.2 m and about 2.4 m or between 1.2 m and 2.4 m.

Aspect 17: The roof fairing of any one of aspects 1A-16, further comprising: a first air duct that is inboard of the first side wall and that extends from the forward end to the trailing end, wherein the first air duct includes at least one vane; and a second air duct that is inboard of the second side wall and that extends from the forward end to the trailing end, wherein the second air duct includes at least one vane.

Aspect 18: The roof fairing of aspect 17, wherein each air duct defines an internal passage and a passage width, wherein the passage width decreases toward the trailing end of the flow directing body.

Aspect 19: The roof fairing of any one of aspects 17-18, wherein the at least one vane of the first air duct extends along an entirety of the respective air duct; and wherein the at least one vane of the second air duct extends along an entirety of the respective air duct.

Aspect 20: The roof fairing of any one of aspects 17-19, wherein the first air duct and the second air duct each have an inlet end proximate the forward end and an outlet end that is aligned with the trailing end, wherein the inlet ends are spaced apart a first distance and the outlet ends are spaced apart a second distance that is greater than the first distance.

Aspect 21: The roof fairing of any one of aspects 17-20, further comprising an internal frame attached to an inner surface of the flow directing body, the internal frame configured to support the flow directing body.

Aspect 22: A fairing for a roof of a vehicle, the fairing comprises a flow directing body. The flow directing body includes a forward end, a trailing end opposite the forward end along a forward-rearward axis, a top that extends from the forward end to the trailing end and is coupled between the forward end and the trailing end, a lower edge that extends from the forward end the trailing end and configured to be disposed along the roof of the vehicle, a first side wall extending from the top toward the lower edge, and a second side wall opposite to the first side wall and extending from the top toward the lower edge. An exterior surface of the flow directing body defines a plurality of flow directing channels that extend generally along the forward-rearward axis, with each of the plurality of flow directing channels is spaced apart from the forward end and terminate at the trailing end. The fairing also comprises a first air duct that is inboard of the first side wall and that extends from the forward end to the trailing end, wherein the first air duct includes at least one vane. The fairing also comprises a second air duct that is inboard of the second side wall and that extends from the forward end to the trailing end, wherein the second air duct includes at least one vane.

Aspect 22B: A fairing for a roof of a vehicle, the fairing consisting essentially of a flow directing body. The flow directing body includes a forward end, a trailing end opposite the forward end along a forward-rearward axis, a top that extends from the forward end to the trailing end and is coupled between the forward end and the trailing end, a lower edge that extends from the forward end the trailing end and configured to be disposed along the roof of the vehicle, a first side wall extending from the top toward the lower edge, and a second side wall opposite to the first side wall and extending from the top toward the lower edge. An exterior surface of the flow directing body defines a plurality of flow directing channels that extend generally along the forward-rearward axis, with each of the plurality of flow directing channels is spaced apart from the forward end and terminate at the trailing end. The fairing also comprises a first air duct that is inboard of the first side wall and that extends from the forward end to the trailing end, wherein the first air duct includes at least one vane. The fairing also comprises a second air duct that is inboard of the second side wall and that extends from the forward end to the trailing end, wherein the second air duct includes at least one vane.

Aspect 22C: A fairing for a roof of a vehicle, the fairing consisting of a flow directing body. The flow directing body includes a forward end, a trailing end opposite the forward end along a forward-rearward axis, a top that extends from the forward end to the trailing end and is coupled between the forward end and the trailing end, a lower edge that extends from the forward end the trailing end and configured to be disposed along the roof of the vehicle, a first side wall extending from the top toward the lower edge, and a second side wall opposite to the first side wall and extending from the top toward the lower edge. An exterior surface of the flow directing body defines a plurality of flow directing channels that extend generally along the forward-rearward axis, with each of the plurality of flow directing channels is spaced apart from the forward end and terminate at the trailing end. The fairing also comprises a first air duct that is inboard of the first side wall and that extends from the forward end to the trailing end, wherein the first air duct includes at least one vane. The fairing also comprises a second air duct that is inboard of the second side wall and that extends from the forward end to the trailing end, wherein the second air duct includes at least one vane.

Aspect 23: The roof fairing of any of aspects 22A-22C wherein each of the flow direction channels have an inlet spaced from the forward end, an outlet aligned with the trailing end, and a constriction disposed rearward relative to the inlet, whereby the constriction increases a velocity of air flowing through the flow directing channel.

Aspect 24: The roof fairing of any of aspects 22A-C or aspect 23, wherein each flow channel has a length that extends from the inlet to the outlet, wherein the flow channel tapers along at least a portion of the length so as to define the constriction.

Aspect 25: The roof fairing of any one of aspects 22A-24, wherein each flow channel has a width that is perpendicular to the forward-rearward axis, wherein the width decreases as the flow channel extends to the trailing end.

It is to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

While the disclosure is described herein using a limited number of aspects, these specific aspects are not intended to limit the scope of the disclosure as otherwise described and claimed herein. The precise arrangement of various elements and order of the steps of articles and methods described herein are not to be considered limiting.

What is claimed is:

1. A roof fairing for a heavy truck hauling a cargo trailer, the roof fairing comprising:
   a. a body defining a flow directing exterior surface, with the body including:
      an upper surface that is generally planar and horizontal;
      a front surface continuous with the upper surface and extending away therefrom in a forward direction along a longitudinal axis, wherein the front surface slopes gradually to a front edge that is shaped to conform to a roof of the heavy truck;
      a left side surface continuous with the upper surface and the front surface, the left side surface being generally planar and vertical and extending parallel to the longitudinal axis;
      a right side surface continuous with to the upper surface and the front surface, the right side surface being generally planar and vertical and extending parallel to the longitudinal axis opposite the left side surface with respect to the longitudinal axis; and
      an interior surface opposite the flow direction exterior surface, the left side surface, and the right side surface;
      wherein the upper surface, the left side surface and the right side surface terminate along a trailing end of the body towards a rear end of the heavy truck when the roof fairing is on the roof of the heavy truck, and
      wherein at least one of the upper surface, left side surface, and right side surface defines a flow directing channel that is sunk into the body toward an inner space defined by the interior surface, the flow directing channel comprising a venturi construction terminating at the trailing end, the venturi construction configured to direct flow toward an exterior surface of the cargo trailer when coupled to the heavy truck.

2. A roof fairing for a vehicle, the roof fairing comprising:
   a flow directing body defining an exterior surface, the exterior surface having:
      a forward end;
      a trailing end opposite the forward end along a forward-rearward axis;
      a top that extends from the forward end to the trailing end and is coupled between the forward end and the trailing end;
      a lower edge that extends from the forward end to the trailing end and configured to be disposed along the roof of the vehicle;
      a first side extending from the top toward the lower edge;
      a second side opposite to the first side and extending from the top toward the lower edge; and
      wherein an exterior surface of the flow-directing body defines a plurality of flow channels sunk into the flow directing body and that extend generally along the forward-rearward axis, with each flow-channel of the plurality of flow-channels spaced apart from the forward end and terminating at the trailing end, the flow channels comprising a venturi construction.

3. The roof fairing of claim 2, wherein each flow channel has an inlet that is spaced apart from the forward end of the flow-directing body, an outlet that is aligned with the trailing end, and a constriction disposed rearward relative to the inlet.

4. The roof fairing of claims 2, wherein each flow channel has a width that is perpendicular to the forward-rearward axis, wherein the width decreases as the flow channel extends to the trailing end.

5. The roof fairing of claim 2, wherein each flow channel has a depth that is perpendicular to a width of the flow channel, wherein the depth increases as the flow channel extends along the forward-rearward axis to the trailing end.

6. The roof fairing of claim 2, wherein each flow channel has a width that is perpendicular to the forward-rearward axis, and a depth that is perpendicular to the width, wherein the width decreases along the depth.

7. The roof fairing of claim 1, wherein an inlet of the flow channel has a width-to-depth ratio that is greater than a width-to-depth ratio of an outlet of the flow channel.

8. The roof fairing of claim 7, wherein the width-to-depth ratio of the flow channel is between about 1.0 and about 5.0.

9. The roof fairing of claim 2, wherein the plurality of flow channels include a) at least one top flow channel disposed along the top of the flow directing body, b) at least one first side flow channel disposed along the first side, and c) at least one second side flow channel disposed along the second side.

10. The roof fairing of claim 2, wherein the plurality of flow directing channels are top flow directing channels disposed along the top of the flow directing body.

11. The roof fairing of claim 2, wherein the plurality of flow-directing channels are side flow directing channels disposed along the first side and the second side.

12. The roof fairing of claim 2, wherein the flow directing body includes a tapered forward section and a rearward section that is rearward of the tapered forward section along the forward-rearward axis, wherein an entirety of each of the flow directing channels are disposed along the rearward section.

13. The roof fairing of claim 2, wherein each of the plurality of flow-directing channels are disposed rearward of a plane that divides the flow-directing body into the tapered forward section and the rearward section, wherein the plane is perpendicular to the forward-rearward axis and the first and second sides.

14. The roof fairing of claim 2, wherein the lower edge defines a footprint having a fairing length that extends from the forward end to the trailing end along the forward-rearward axis and a fairing width that extends from the first side to the second side along a transverse direction that is perpendicular to the forward-rearward axis, wherein a fairing length is greater or equal to a fairing width.

15. The roof fairing of claim 14 wherein a fairing length is between 1.2 m and about 2.4 m.

16. The roof fairing of claim 2, further comprising:
  a. a first air duct that is inboard of the first side and that extends from the forward end to the trailing end, wherein the first air duct includes at least one vane; and
  b. a second air duct that is inboard of the second side and that extends from the forward end to the trailing end, wherein the second air duct includes at least one vane.

17. The roof fairing of claim 16, wherein each air duct defines an internal passage and a passage width, wherein the passage width decreases toward the trailing end of the flow directing body.

18. The roof fairing of claim 16, wherein the at least one vane of the first air duct extends along an entirety of the respective air duct; and
  a. wherein the at least one vane of the second air duct extends along an entirety of the respective air duct.

19. The roof fairing according to claim 15, wherein the first air duct and the second air duct each have an inlet end proximate the forward end and an outlet end that is aligned with the trailing end, wherein the inlet ends are spaced apart a first distance and the outlet ends are spaced apart a second distance that is greater than the first distance.

20. The roof fairing of claim 1, further comprising an internal frame attached to an interior surface of the flow directing body, the internal frame configured to support the flow directing body.

* * * * *